United States Patent
Yasui

(10) Patent No.: US 12,337,594 B2
(45) Date of Patent: Jun. 24, 2025

(54) PRINTING APPARATUS AND PRINTING METHOD

(71) Applicant: SEIKO EPSON CORPORATION, Tokyo (JP)

(72) Inventor: Masashi Yasui, Nagano (JP)

(73) Assignee: Seiko Epson Corporation, Tokyo (JP)

(*) Notice: Subject to any disclaimer, the term of this patent is extended or adjusted under 35 U.S.C. 154(b) by 160 days.

(21) Appl. No.: 18/460,726

(22) Filed: Sep. 5, 2023

(65) Prior Publication Data

US 2024/0075733 A1    Mar. 7, 2024

(30) Foreign Application Priority Data

Sep. 6, 2022    (JP) .................................. 2022-141215

(51) Int. Cl.
*B41J 2/045*    (2006.01)

(52) U.S. Cl.
CPC ....... *B41J 2/04508* (2013.01); *B41J 2/04586* (2013.01)

(58) Field of Classification Search
CPC ... B41J 2/01; B41J 2/145; B41J 2/2132; B41J 2/04508; B41J 2/04586; G06K 15/027; G06K 15/107
See application file for complete search history.

(56) References Cited

U.S. PATENT DOCUMENTS 8,439,465 B2 *   5/2013   Mitsuzawa ............ B41J 2/2132
                                                      347/14
2014/0292863 A1  10/2014  Tanase et al.

FOREIGN PATENT DOCUMENTS

JP    2014-195897 A    10/2014

* cited by examiner

*Primary Examiner* — Thinh H Nguyen
(74) *Attorney, Agent, or Firm* — Global IP Counselors, LLP

(57) ABSTRACT

A printing head includes an overlapping portion in which a first nozzle row in which a plurality of first nozzles and a second nozzle row in which a plurality of second nozzles. The printing head includes n nozzle pairs of the first nozzles and the second nozzles. A control unit causes the printing head to print a TP for determining a use range of the first nozzles and a use range of the second nozzles in the overlapping portion, by m specified nozzle pairs (where $0 \leq m < n$) of the first nozzles and the second nozzles used for ejection of the first liquid of the nozzle pairs. The control unit determines the use ranges, based on density of a specified region from a first printing position of the first nozzle to a second printing position of the second nozzle on the TP.

9 Claims, 7 Drawing Sheets

PRINTING APPARATUS AND PRINTING METHOD

The present application is based on, and claims priority from JP Application Serial Number 2022-141215, filed Sep. 6, 2022, the disclosure of which is hereby incorporated by reference herein in its entirety.

BACKGROUND

1. Technical Field

The present disclosure relates to a printing apparatus and a printing method.

2. Related Art

There has been known a printer that performs printing by using a printing unit including a first nozzle row group and a second nozzle row group that are arrayed in a direction intersecting with a predetermined direction (see JP-A-2014-195897). In the first nozzle row group, first nozzle rows in which first nozzles that eject a first liquid are arrayed in the predetermined direction are arrayed in the predetermined direction, and ends of the first nozzle rows adjacent to each other overlap with each other. In the second nozzle row group, second nozzle rows in which second nozzles that eject a second liquid are arrayed in the predetermined direction are arrayed in the predetermined direction, and ends of the second nozzle rows adjacent to each other overlap with each other.

In the printer, mounting positions of the nozzle row groups that eject the different liquids are erroneously deviated from each other in the predetermined direction, or mounting positions of the nozzle rows that eject the same liquid are erroneously deviated from each other in the predetermined direction. The erroneous deviation between the nozzle rows that eject the same liquid causes density unevenness such as a black streak and a white streak in a printing result acquired by the overlapping portion of the nozzle rows that eject the same liquid.

In a case of the erroneous deviation between the nozzle row groups that eject the different liquids, printing data allocated to the respective nozzle groups are shifted in the predetermined direction by a suitable amount. With this, deviation between the different liquids, that is, deviation between the colors is suppressed. However, even in a case in which the date shift amount is adjusted to suppress deviation between the colors as described above, when data shifting is performed in units of the nozzle rows to eliminate density unevenness due to the overlapping portion of the nozzle rows that eject the same liquid, deviation between the colors is easily caused again.

Thus, improvement for eliminating density unevenness due to the overlapping portion of the nozzle rows that eject the same liquid is required.

Further, when upstream ends and downstream ends of the nozzle rows in a medium transport direction match with a corresponding region of a medium so that the overlapping portion of the nozzle rows is sequentially formed to perform printing, similar improvement for eliminating density improvement is also required.

SUMMARY

A printing apparatus includes a printing head including a first nozzle row in which a plurality of first nozzles configured to eject a first liquid onto a medium are arrayed in a predetermined nozzle array direction, and a second nozzle row in which a plurality of second nozzles configured to eject the first liquid onto the medium are arrayed in the nozzle array direction, and a control unit configured to control ejection of a liquid including the first liquid from the printing head, wherein the printing head includes an overlapping portion in which a part of the first nozzle row and a part of the second nozzle row overlap with each other, as seen in a first direction intersecting with the nozzle array direction, the overlapping portion includes n nozzle pairs arrayed in the nozzle array direction, where n is an integer equal to or greater than 2, and each of the n nozzle pairs is a pair of the first nozzle having a position within the overlapping portion of the first nozzle row and the second nozzle having a position within the overlapping portion of the second nozzle row corresponding to the position of the first nozzle, when the control unit controls the printing head to print, on the medium, a test pattern for determining a use range of the first nozzles and a use range of the second nozzles in the overlapping portion, the control unit causes the test pattern to be printed by, of the nozzle pairs, m specified nozzle pairs of the first nozzles and the second nozzles used for ejection of the first liquid, where m is an integer equal to or greater than 0 and less than n, the control unit determines the use ranges, based on density of a specified region from a first printing position to a second printing position, the first printing position is, of printing positions by the first nozzles in the test pattern printed on the medium, a printing position closest to a printing region by the second nozzles, and the second printing position is, of printing positions by the second nozzles in the test pattern printed on the medium, a printing position closest to a printing region by the first nozzles.

A printing apparatus includes a printing head including nozzle rows in which a plurality of nozzles configured to eject a first liquid onto a medium are arrayed in a predetermined nozzle array direction, a carriage configured to cause the printing head to scan the medium along a main scanning direction intersecting with the nozzle array direction, a transport unit configured to transport the medium in a transport direction intersecting with the main scanning direction, and a control unit configured to control ejection of a liquid including the first liquid from the printing head, wherein the transport unit transports the medium between one scan and a scan subsequent thereto such that a region of the medium printable by using an upstream portion including first nozzles during the one scan is printable by using a downstream portion including second nozzles during the scan subsequent to the one scan, the first nozzles being a plurality of nozzles upstream in the transport direction of the nozzle rows, the second nozzles being a plurality of nozzles downstream in the transport direction of the nozzle rows, the upstream portion and the downstream portion include n nozzle pairs, where n is an integer equal to or greater than 2, and each of the n nozzle pairs is a pair of the first nozzle having a position within the upstream portion and the second nozzle having a position within the downstream portion corresponding to the position of the first nozzle, when the control unit controls the printing head to print, on the medium, a test pattern for determining a use range of the first nozzles in the upstream portion and a use range of the second nozzles in the downstream portion, the control unit causes the test pattern to be printed by, of the nozzle pairs, m specified nozzle pairs of the first nozzles and the second nozzles used for ejection of the first liquid, where m is an integer equal to or greater than 0 and less than n, the control unit determines the use ranges, based on density of a specified region from a first printing position to a second printing position, the first printing position is, of printing positions by the first nozzles in the test pattern printed on the medium, a printing position closest to a printing region by the second nozzles, and the second printing position is, of printing positions by the second nozzles in the test pattern printed on the medium, a printing position closest to a printing region by the first nozzles.

A printing method is for controlling ejection of a liquid including a first liquid from a printing head, the printing head including a first nozzle row in which a plurality of first nozzles configured to eject the first liquid onto a medium are arrayed in a predetermined nozzle array direction and a second nozzle row in which a plurality of second nozzles configured to eject the first liquid onto the medium are arrayed in the nozzle array direction, wherein the printing head includes an overlapping portion in which a part of the first nozzle row and a part of the second nozzle row overlap with each other, as seen in a first direction intersecting with the nozzle array direction, the overlapping portion includes n nozzle pairs arrayed in the nozzle array direction, where n is an integer equal to or greater than 2, and each of the n nozzle pairs is a pair of the first nozzle having a position within the overlapping portion of the first nozzle row and the second nozzle having a position within the overlapping portion of the second nozzle row corresponding to the position of the first nozzle, when the printing head is controlled to print, on the medium, a test pattern for determining a use range of the first nozzles and a use range of the second nozzles in the overlapping portion, the test pattern is printed by, of the nozzle pairs, m specified nozzle pairs of the first nozzles and the second nozzles used for ejection of the first liquid, where m is an integer equal to or greater than 0 and less than n, the use ranges are determined based on density of a specified region from a first printing position to a second printing position, the first printing position is, of printing positions by the first nozzles in the test pattern printed on the medium, a printing position closest to a printing region by the second nozzles, and the second printing position is, of printing positions by the second nozzles in the test pattern printed on the medium, a printing position closest to a printing region by the first nozzles.

A printing method is for controlling ejection of a liquid including a first liquid from a printing head, the printing head including nozzle rows in which a plurality of nozzles configured to eject the first liquid onto a medium are arrayed in a predetermined nozzle array direction, and the printing method includes a scanning step of causing the printing head to scan the medium along a main scanning direction intersecting with the nozzle array direction, and a transport step of transporting the medium in a transport direction intersecting with the main scanning direction, wherein, in the transport step, the medium is transported between one scan and a scan subsequent thereto such that a region of the medium printable by using an upstream portion including first nozzles during the one scan is printable by using a downstream portion including second nozzles during the scan subsequent to the one scan, the first nozzles being a plurality of nozzles upstream in the transport direction of the nozzle rows, the second nozzles being a plurality of nozzles downstream in the transport direction of the nozzle rows, the upstream portion and the downstream portion include n nozzle pairs, where n is an integer equal to or greater than 2, and each of the n nozzle pairs is a pair of the first nozzle having a position within the upstream portion and the second nozzle having a position within the downstream portion corresponding to the position of the first nozzle, when the printing head is controlled to print, on the medium, a test pattern for determining a use range of the first nozzles in the upstream portion and a use range of the second nozzles in the downstream portion, the test pattern is printed by, of the nozzle pairs, m specified nozzle pairs of the first nozzles and the second nozzles used for ejection of the first liquid, where m is an integer equal to or greater than 0 and less than n, the use ranges are determined based on density of a specified region from a first printing position to a second printing position, the first printing position is, of printing positions by the first nozzles in the test pattern printed on the medium, a printing position closest to a printing region by the second nozzles, and the second printing position is, of printing positions by the second nozzles in the test pattern printed on the medium, a printing position closest to a printing region by the first nozzles.

DESCRIPTION OF EMBODIMENTS

Embodiments of the present disclosure are described below with reference to the drawings. Note that each of the drawings is merely illustrative for describing the embodiments. Since the drawings are illustrative, proportions, shapes, and shading may not be precise, consistent, or may be partially omitted.

1. Overall Description of Apparatus Configuration

Figure 1:
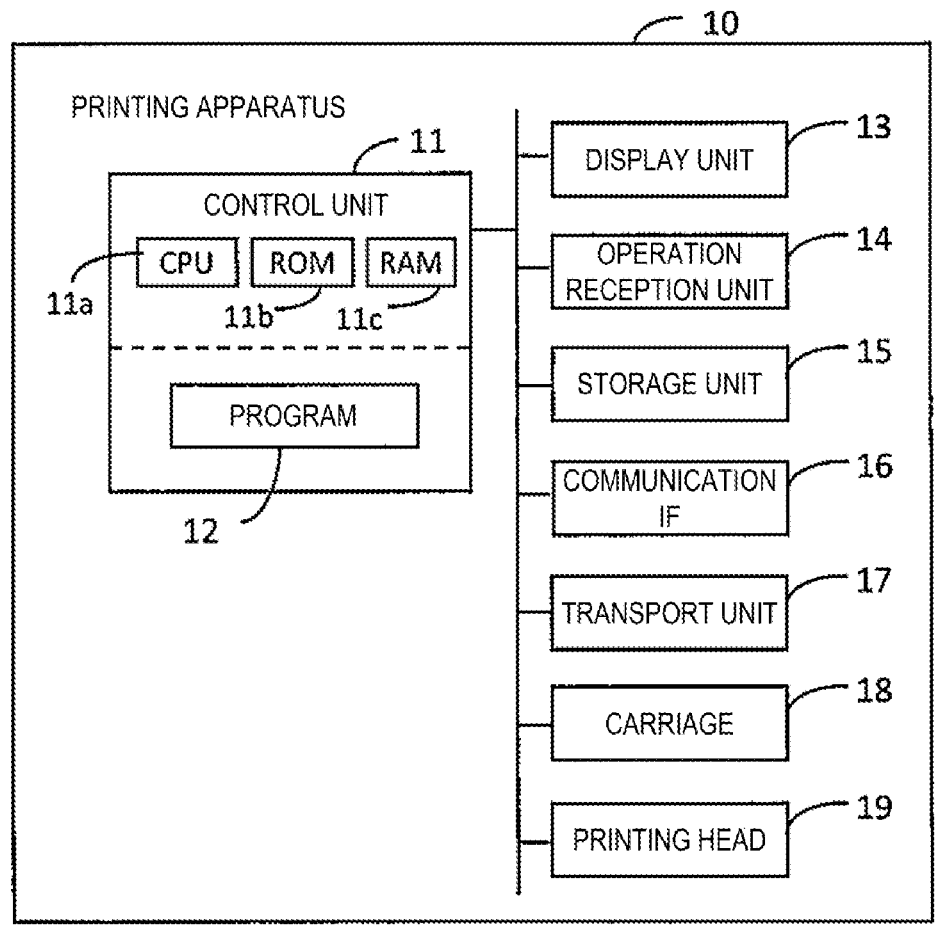
FIG. 1 is a block diagram illustrating a device configuration in a simplified manner.

FIG. 1 illustrates a configuration of a printing apparatus 10 according to the present embodiment in a simplified manner. The printing apparatus 10 executes a printing method.

The printing apparatus 10 includes a control unit 11, a display unit 13, an operation reception unit 14, a storage unit 15, a communication IF 16, a transport unit 17, a carriage 18, and a printing head 19. However, in the first embodiment of the first embodiment and the second embodiment that are described later, the carriage 18 is not required. IF is an abbreviation for interface. The control unit 11 includes, as a processor, one or more ICs including a CPU 11*a*, a ROM 11*b*, a RAM 11*c*, and the like, another non-volatile memory, and the like.

In the control unit 11, the processor, that is, the CPU 11*a* executes arithmetic processing in accordance with a program 12 stored in the ROM 11*b*, the other memory, or the like, using the RAM 11*c* or the like as a work area, to control the printing apparatus 10. The processor is not limited to the single CPU, and a configuration may be adopted in which the processing is executed by a hardware circuit such as a plurality of CPUs, an ASIC, or the like, or a configuration may be adopted in which the CPU and the hardware circuit work in concert to execute the processing.

The display unit 13 is a unit for displaying visual information, and is configured, for example, by a liquid crystal display, an organic EL display, or the like. The display unit 13 may include a display and a drive circuit for driving the display.

The operation reception unit 14 is a unit for receiving an input by a user, and is realized, for example, by a physical button, a touch panel, a mouse, a keyboard, or the like. Of course, the touch panel may be realized as a function of the display unit 13. The display unit 13 and the operation reception unit 14 may be collectively referred to as an operation panel of the printing apparatus 10.

For example, the storage unit 15 is a storage unit such as a hard disk drive, a solid state drive, and another memory. Part of the memory of the control unit 11 may be regarded as the storage unit 15. The storage unit 15 may be regarded as part of the control unit 11. The display unit 13, the operation reception unit 14, and the storage unit 15 may be peripheral devices externally coupled to the printing apparatus 10.

The communication IF 16 is a generic term for one or a plurality of IFs for establishing communication between the printing apparatus 10 and an external device in a wired or wireless manner, in accordance with a prescribed communication protocol including a known communication standard provide. For example, the external device is a communication device such as a personal computer, a server, a smartphone, and a tablet type terminal.

The transport unit 17 is a unit for transporting the medium 30 along a predetermined transport direction under the control of the control unit 11. For example, the transport unit 17 includes a roller that rotates to transport the medium 30, a motor as a driving source for rotation, and the like. The transport unit 17 may be a mechanism that places the medium 30 on a pallet, a belt, a drum, or the like to transport the medium 30. The medium 30 is a sheet, for example. The medium 30 is only required to be a medium functioning as a printing target with a liquid, and may be a material other than paper, such as fabric and a film.

The carriage 18 is a moving unit that reciprocates along a predetermined main scanning direction by a driving force of a carriage motor (not illustrated) under the control of the control unit 11. The printing head 19 is mounted on the carriage 18. Movement of the printing head 19 by the carriage 18 is also referred to as "scan" or "pass".

The printing head 19 is a unit that performs printing by ejecting a liquid onto the medium 30 by an ink-jetting method under the control of the control unit 11. The liquid is mainly ink, but the printing head 19 is capable of ejecting a liquid other than ink. The printing head 19 is capable of ejecting a plurality of colors of ink, such as cyan (C), magenta (M), yellow (Y), and black (K). As a matter of course, the ink ejected from the printing head 19 is not limited to C, M, Y, and K ink.

The configuration of the printing apparatus 10 may be realized by a single printer, or may be realized by a plurality of devices or machines that are communicatively coupled to each other. When the printing apparatus 10 is regarded as a system including a plurality of devices, for example, there are provided an information processing unit that functions as the control unit 11 and a printer that includes the transport unit 17, the carriage 18, and the printing head 19 and performs printer under the control of the information processing device. In this case, the information processing device can be regarded as a printing control device, an image processing device, or the like.

2. First Embodiment

Figure 2:
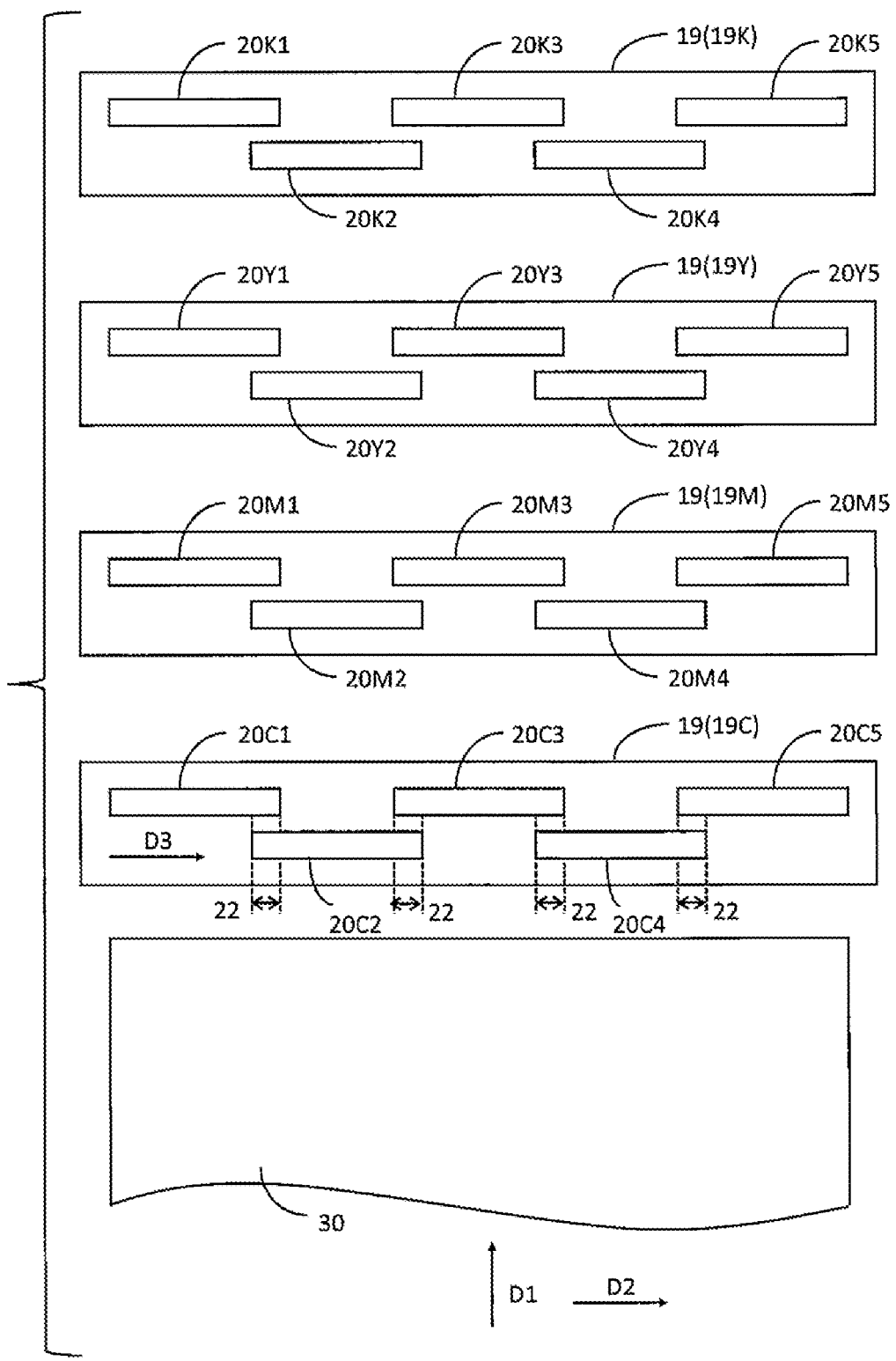
FIG. 2 is a diagram illustrating a relationship between a printing head according to a first embodiment and a medium, as seen from above, in a simplified manner.

FIG. 2 illustrates a relationship between the printing head 19 according to the first embodiment and the medium 30, as seen from above, in a simplified manner. A direction D1 is transport direction D1 in which the transport unit 17 transports the medium 30, and a direction D2 intersecting with the transport direction D1 is a width direction D2 of the medium 30. Intersection between the transport direction D1 and the width direction D2 may be regarded as orthogonal intersection or substantially orthogonal intersection. The transport unit 17 transports the medium 30 from upstream to downstream in the transport direction D1. Upstream and downstream in the transport direction D1 are simply referred to as upstream and downstream. In the first embodiment, the transport direction D1 corresponds to the "first direction".

In the example of FIG. 2, as the printing head 19, printing heads 19C, 19M, 19Y, and 19K are illustrated. The plurality of printing heads 19C, 19M, 19Y, and 19K are arrayed in the transport direction D1, and are fixed in a transport path of the medium 30. Each of the printing heads 19C, 19M, 19Y, and 19K includes a plurality of nozzle rows. For example, the printing head 19C capable of ejecting C ink is configured by five nozzle rows including nozzle rows 20C1, 20C2, 20C3, 20C4, and 20C5. As a matter of course, the number of nozzle rows of the printing head 19 corresponding one type of a liquid may not be five. Similarly, the printing head 19M capable of ejecting M ink is configured by nozzle rows 20M1, 20M2, 20M3, 20M4, and 20M5. The printing head 19Y capable of ejecting Y ink is configured by nozzle rows 20Y1, 20Y2, 20Y3, 20Y4, and 20Y5. The printing head 19K capable of ejecting K ink is configured by nozzle rows 20K1, 20K2, 20K3, 20K4, and 20K5.

Each one of the printing heads 19C, 19M, 19Y, and 19K has a length in the width direction D2 so as to cover the medium width being the length of the medium 30 in the width direction D2. The printing head 19 according to the first embodiment as described above is a so-called line-type printing head. The configurations of the printing heads 19C, 19M, 19Y, and 19K are basically the same except for the colors of the ink to be ejected, and hence description is made on the printing head 19C as a representative example. All the nozzle rows 20C1, 20C2, 20C3, 20C4, and 2005 of the printing head 19C are configured by a plurality of nozzles 21 that eject a "first liquid" being the same liquid and are arrayed in a predetermined nozzle array direction D3. In a case of the printing head 19C, the first liquid is the C ink as a matter of course. As to the printing head 19M, the first liquid is the M ink. When a certain printing head 19 is focused, and a liquid ejected from the printing head 19 is referred to as the first liquid, a liquid ejected from another printing head 19 may be referred to as a second liquid.

Figure 3A:
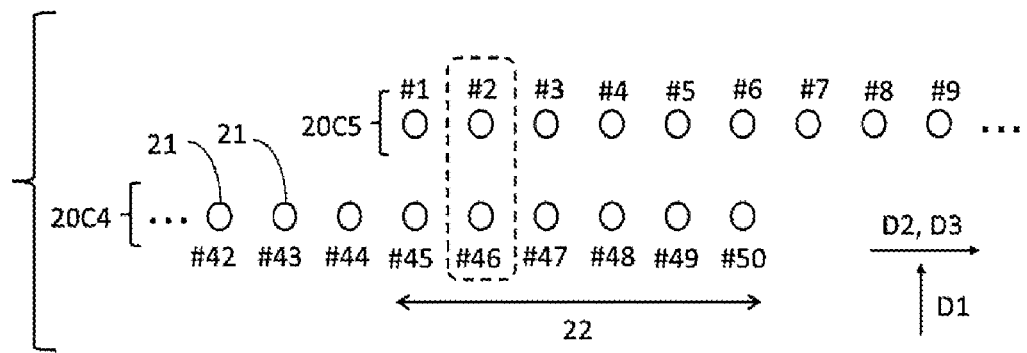
FIG. 3A is a diagram illustrating a part of a first nozzle row and a second nozzle row in an ideal state in the first embodiment.

In FIG. 2, each of the nozzle rows is indicated as a simple rectangular shape, and each of the nozzles 21 of the nozzle row is omitted in illustration. In FIG. 3A and the like given below, each of the nozzles 21 is indicated with a circle. An interval between the nozzles 21 adjacent to each other in the nozzle array direction D3 is referred to as a nozzle pitch. The nozzle pitch is constant in designing. In the example of FIG. 2, the nozzle array direction D3 is parallel with the width direction D2. However, the nozzle array direction D3 may be inclined obliquely with respect to the width direction D2. In any case, the nozzle array direction D3 intersects with the transport direction D1. Further, an interval between the nozzles 21 in the width direction D2 may be regarded as a nozzle pitch.

In the first embodiment, one nozzle row of the two nozzle rows adjacent to each other in the nozzle array direction D3 within one printing head 19 is referred to as a "first nozzle row" in which a plurality of "first nozzles" for ejecting the first liquid are arrayed in the nozzle array direction D3, and the other nozzle row thereof is referred to as a "second nozzle row" in which a plurality of "second nozzles" for ejecting the first liquid are arrayed in the nozzle array direction D3. Those names are merely for convenient distinction between the two nozzle rows. For example, as to the nozzle row 20C3 and the nozzle row 20C4 within the printing head 19C, the nozzle row 20C3 is regarded as the first nozzle row in which the first nozzles for ejecting the C ink are arrayed in the nozzle array direction D3. In this case, the nozzle row 20C4 can be regarded as the second nozzle row in which the second nozzles for ejecting the C ink are arrayed in the nozzle array direction D3. Similarly, as to the nozzle row 20C4 and the nozzle row 20C5, the nozzle row 20C4 is regarded as the first nozzle row in which the first nozzles for ejecting the C ink are arrayed in the nozzle array direction D3. In this case, the nozzle row 20C5 can be regarded as the second nozzle row in which the second nozzles for ejecting the C ink are arrayed in the nozzle array direction D3. The control unit 11 controls ejection of liquids including the first liquid by the printing head 19.

In the first embodiment, the printing head 19 includes an "overlapping portion 22" in which a part of the first nozzle row and a part of the second nozzle row overlap with each other as viewed in the first direction intersecting with the nozzle array direction D3. In other words, in a case of the plurality of nozzle rows of the one printing head 19, the ends of the adjacent nozzle rows overlap with each other in the nozzle array direction D3. In FIG. 2, as an example, a range of each overlapping portion 22 of the printing head 19C is illustrated in an understandable way. Note that, of the ranges in which the nozzles 21 of the printing head 19 are arrayed, a range that does not correspond to the overlapping portion 22 is referred to as a "normal portion".

In the first embodiment, a pair of the first nozzle and the second nozzle establishing such a relationship that a position in the first nozzle row within the overlapping portion 22 and a position in the second nozzle row within the overlapping portion 22 correspond to each other is referred to as a "nozzle pair". The one overlapping portion 22 includes n nozzle pairs arrayed in the nozzle array direction D3. n is an integer equal to or greater than 2, for example, n=64. Herein, right and left as seen from a viewpoint from upstream to downstream are simply referred to as right and left. The first nozzle and the second nozzle establishing such a relationship that the position in the first nozzle row within the overlapping portion 22 and the position in the second nozzle row within the overlapping portion 22 correspond to each other indicate the first nozzle and the second nozzle in the same order in the right-and-left direction within the overlapping portion 22. For example, in the overlapping portion 22 of the nozzle row 20C4 and the nozzle row 20C5, the leftmost nozzle 21 in the nozzle row 20C4 and the leftmost nozzle 21 in the nozzle row 20C5 form one nozzle pair. In a similar manner, in the overlapping portion 22 of the nozzle row 20C4 and the nozzle row 20C5, the second nozzle 21 from the left in the nozzle row 20C4 and the second nozzle 21 from the left in the nozzle row 20C5 form one nozzle pair.

The control unit 11 causes the printing head 19 to eject the ink onto the medium 30, based on printing data indicating an image. As is known, in the printing head 19, a driving element is provided to each of the nozzles 21, and application of a driving signal to the driving element of each of the nozzles 21 is controlled in accordance with the printing data to cause each of the nozzles 21 to eject a dot or stop ejection of a dot. In this manner, the image indicated by the printing data is printed on the medium 30. The dot is a liquid droplet of ink or the like ejected from the nozzle 21. Herein, it is assumed that the printing data is data that defines ejection or non-ejection of the dot for each pixel and for each of C, M, Y, and K. Ejection of the dot is also referred to as dot-on, and non-ejection of the dot is also referred to as dot-off. In the first embodiment, the control unit 11 controls the transport unit 17 and the printing head 19 to eject the ink onto the medium 30 passing under the printing heads 19C, 19M, 19Y, and 19K. In this manner, the image is printed on the medium 30.

FIG. 3A illustrates a part of the first nozzle row and the second nozzle row in an ideal state in the first embodiment in an enlarged manner. The ideal state indicates a state in which there is no erroneous deviation or virtually no erroneous deviation in the positional relationship between the first nozzle row and the second nozzle row in the nozzle array direction D3 that commonly share the overlapping portion 22. In FIG. 3A, the nozzle array direction D3 is parallel with the width direction D2. Herein, it is assumed that the nozzle row 20C4 of the printing head 19C is the first nozzle row and the nozzle row 20C5 is the second nozzle row.

For convenience, in FIG. 3A, the respective nozzles 21 of the one nozzle row are denoted with nozzle numbers from the left to the right along the nozzle array direction D3. In FIG. 3A, as an example, one nozzle row includes fifty nozzles 21. A range corresponding to six sequential nozzles 21 denoted with the nozzle numbers #45 to #50 in the nozzle row 20C4 and a range corresponding to six sequential nozzles 21 denoted with the nozzle numbers #1 to #6 in the nozzle row 20C5 form the overlapping portion 22. In other words, in the example of FIG. 3A, n=6. In the example of FIG. 3A, a range corresponding to thirty-eight sequential nozzles 21 denoted with the nozzle numbers #7 to #44 in each nozzle row corresponds to the normal portion. In FIG. 3A, the nozzle 21 denoted with the nozzle number #46 in the nozzle row 20C4 and the nozzle 21 denoted with the nozzle number #2 in the nozzle row 20C5 are surrounded by the broken line to indicate those nozzles 21 form a nozzle pair in the overlapping portion 22.

In the ideal state as illustrated in FIG. 3A, the first nozzle and the second nozzle that form a nozzle pair, for example, the nozzle 21 denoted with the nozzle number #46 in the nozzle row 20C4 and the nozzle 21 denoted with the nozzle number #2 in the nozzle row 20C5 overlap with each other as viewed in the transport direction D1. In other words, the positions thereof in the width direction D2 match with each other. Thus, in the ideal state, the first nozzle and the second nozzle that form a nozzle pair are capable of ejecting dots of the same color onto the same position on the medium 30. However, an actual product has an individual difference, and such an ideal state is not always achieved.

Figure 3B:
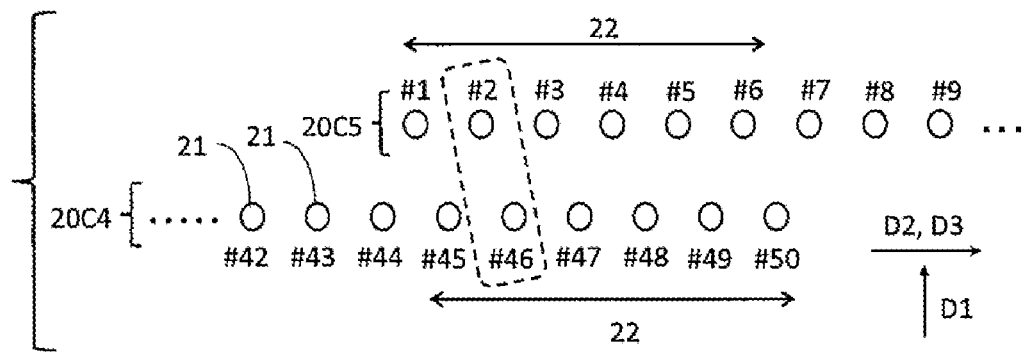
FIG. 3B is a diagram illustrating a part of the first nozzle row and the second nozzle row in a non-ideal state in the first embodiment.
Figure 3C:
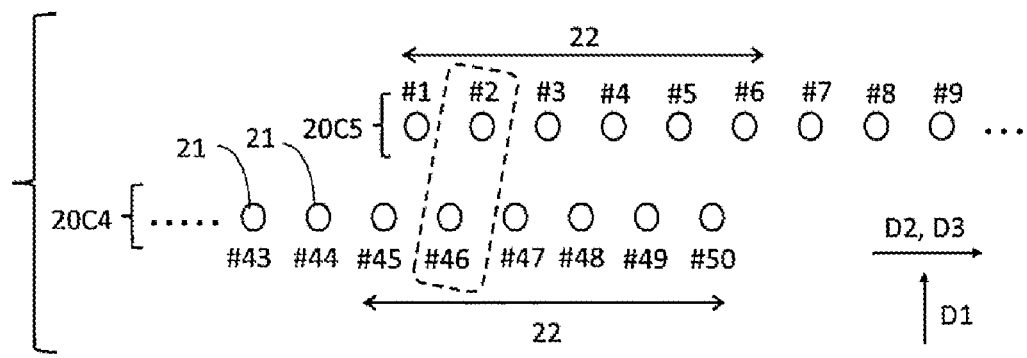
FIG. 3C is a diagram illustrating a part of the first nozzle row and the second nozzle row in a non-ideal state in the first embodiment.

Each of FIG. 3B and FIG. 3C illustrates a part of the first nozzle row and the second nozzle row in a non-ideal state in the first embodiment in an enlarged manner. Description similar to FIG. 3A is omitted for FIG. 3B and FIG. 3C. In the example of FIG. 3B, the positional relationship between the nozzle row 20C4 and the nozzle row 20C5 in the nozzle array direction D3 is closer than that in the ideal state in FIG. 3A. Thus, the nozzle 21 denoted with the nozzle number #46 in the nozzle row 20C4 and the nozzle 21 denoted with the nozzle number #2 in the nozzle row 20C5 that form a nozzle pair are at the positions deviated from each other as viewed in the transport direction D1.

In the example of FIG. 3C, the positional relationship between the nozzle row 20C4 and the nozzle row 20C5 in the nozzle array direction D3 is farther than that in the ideal state in FIG. 3A. Thus, the nozzle 21 denoted with the nozzle number #46 in the nozzle row 20C4 and the nozzle 21 denoted with the nozzle number #2 in the nozzle row 20C5 that form a nozzle pair are at the positions deviated from each other as viewed in the transport direction D1. In this manner, the positional relationship between the first nozzle and the second nozzle that form a nozzle pair within the overlapping portion 22 is in the ideal state or in the non-ideal state.

When the printing head 19 that alternately includes the normal portion and the overlapping portion 22 as described above is used, it is known that one raster line is printed by one nozzle 21 in the normal portion with the ink of one color and one raster line is printed by one nozzle pair in the overlapping portion 22 with the ink of one color. In the first embodiment, the raster line is a line-shaped image having a length component in the transport direction D1, and is a pixel row in which pixels are arrayed in the transport direction D1 in the printing data. Printing one raster line by one nozzle pair with the ink of one color is also referred to as overlap (OL) printing. In the OL printing, each of the two nozzles 21 that form one nozzle pair is used by a usage ratio of 50%, for example.

In a printing result reproduced on the medium 30, a density difference is easily caused between a region formed by respective raster lines printed by the normal portion and a region formed by respective raster lines printed by the respective nozzle pairs in the overlapping portion 22 in the OL printing. This is because the number of nozzles used for printing one raster line is different between the raster line printed by the normal portion and the raster line printed by the overlapping portion 22 in the OL printing. Such a difference affects factors such as ink bleed, drying, and line thickness. As a result, a density difference is caused. Such a density difference is recognized by a user as density unevenness.

In the present embodiment, in order to suppress a density difference between a printing result by the normal portion and a printing result by the overlapping portion 22 as described as much as possible, the OL printing is prevented in the overlapping portion 22 as much as possible. In other words, use of all the n nozzle pairs for the OL printing is prevented. However, it is necessary to avoid a gap that is generated in the width direction D2 between the printing region by the first nozzle row and the printing region by the second nozzle row by avoiding the OL printing.

Description is made below on processing for determining a use range of the first nozzles and a use range of the second nozzles in the overlapping portion 22 by printing a test pattern, as processing for avoiding the OL printing in the overlapping portion 22 as much as possible. A test pattern is abbreviated as TP.

Figure 4:
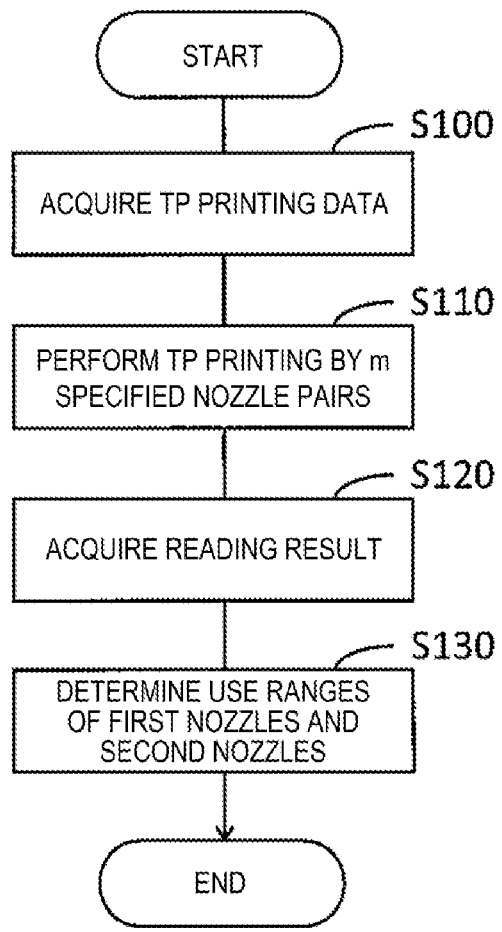
FIG. 4 is a flowchart illustrating processing to be executed by a control unit.

FIG. 4 illustrates, using a flowchart, processing to be executed by the control unit 11 in accordance with the program 12 in the present embodiment.

In step S100, the control unit 11 acquires TP printing data being printing data indicating the TP. For example, in accordance with a TP printing instruction from an operation of the operation reception unit 14 by a user, the control unit 11 acquires the TP printing data from a storage location of the printing data, such as the storage unit 15 and a memory inside or outside of the printing apparatus 10. Alternatively, the control unit 11 receives and acquires the TP printing data transmitted from the external device, via the communication IF 16. As a matter of course, the control unit 11 may execute image processing such as resolution conversion processing, color conversion processing, and halftone processing as required for TP image data acquired through an instruction of a user or transmission from the external device. In this manner, the control unit 11 may generate and acquire the TP printing data.

In the present embodiment, it is assumed that, whether the printing data provided from the control unit 11 to the printing head 19 is the TP printing data or the printing data indicating an image desired by a user, the printing data is provided after being subjected to inter-color shift correction. Description is briefly made on inter-color shift correction. In the example of FIG. 2, erroneous deviation may be caused in the mounting position of each of the printing heads 19C, 19M, 19Y, and 19K in the width direction D2. Thus, for example, with an image of the K ink that is printed by the printing head 19K as a reference, deviation amounts of an image of the C ink, an image of the M ink, and an image of the Y ink that are printed by the printing heads 19C, 19M, and 19Y, respectively, in the width direction D2 are acquired. Then, shift correction in the width direction D2 for eliminating the respective shift amounts of C, M, and Y with respect to K is applied to the printing data provided to the printing heads 19C, 19M, and 19Y, respectively. With this, a printing result without inter-color deviation among C, M, Y, and K is obtained on the medium 30. In the second embodiment described later, inter-color shift correction functions as correction for eliminating inter-color deviation among C, M, Y, and K in the transport direction D1. Description on inter-color shift correction is not given below in detail. However, in the printing data subjected to inter-color shift correction, the raster line of each of the colors C, M, Y, and K is allocated to the nozzle 21 at the specific position in the nozzle row of the printing head 19.

In Step S110, the control unit 11 causes the transport unit 17 to start transporting the medium 30, and controls the printing head 19 to print, on the medium 30, the TP for determining the use range of the first nozzles and the use range of the second nozzles in the overlapping portion 22, based on the TP printing data acquired in Step S100. In this state, the control unit 11 causes the TP to be printed by m pairs of "specified nozzle pairs" of the first nozzles and the second nozzles that are used for ejection of the first liquid, among the nozzle pairs in the overlapping portion 22. Note that it is assumed that $0 \leq m < n$.

Figure 5A:
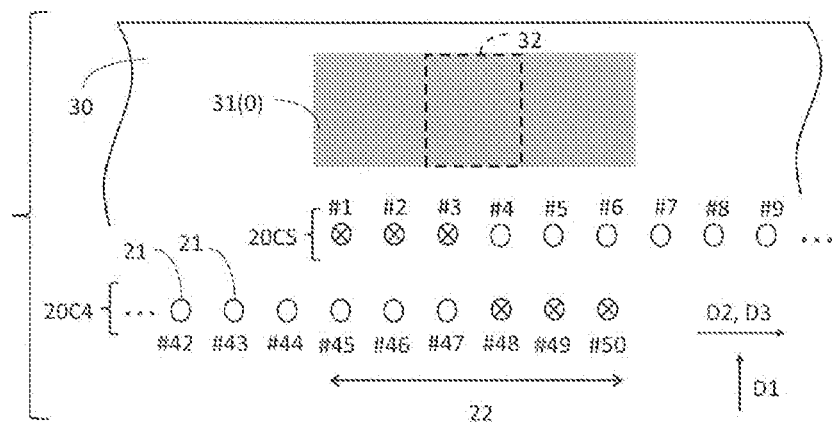
FIG. 5A is a diagram illustrating an overlapping portion and a TP when an adjustment value is 0 in the first embodiment.
Figure 5B:
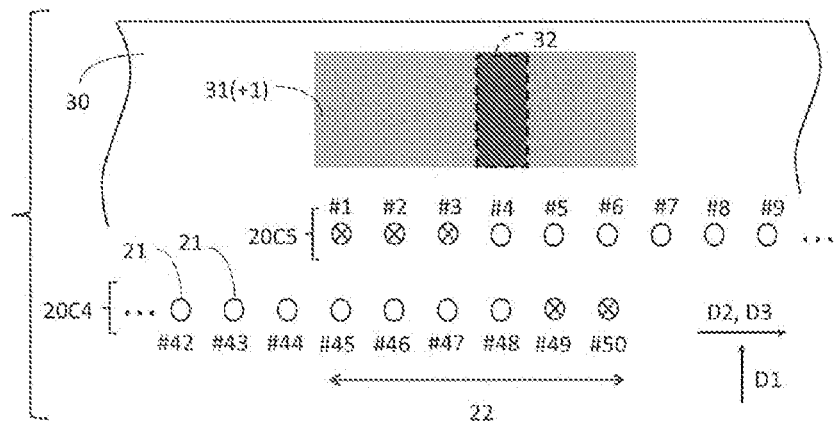
FIG. 5B is a diagram illustrating the overlapping portion and the TP when the adjustment value is +1 in the first embodiment.
Figure 5C:
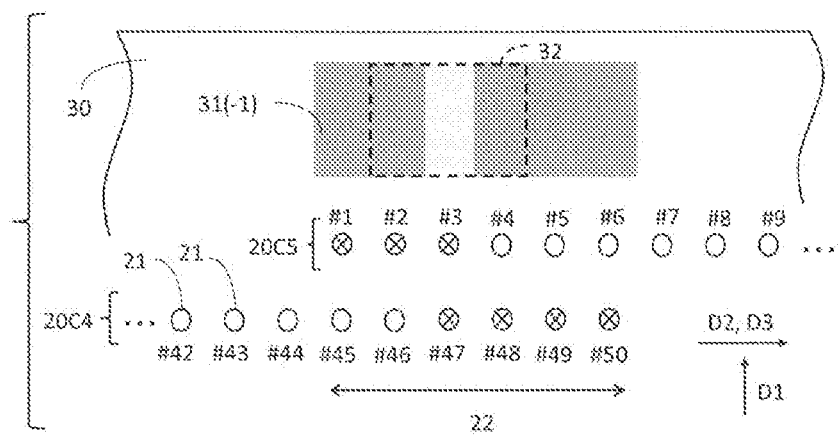
FIG. 5C is a diagram illustrating the overlapping portion and the TP when the adjustment value is −1 in the first embodiment.

Each of FIG. 5A, FIG. 5B, and FIG. 5C illustrates a printing result of a TP 31 in Step S110 together with a part of the printing head 19. As described above, the positional relationship between the first nozzle row and the second nozzle row is not always in the ideal state. Similarly to FIG. 3A, FIG. 5A, FIG. 5B, and FIG. 5C illustrate a part of the first nozzle row and the second nozzle row in the ideal state in the printing head 19C.

First, the matters commonly shared in FIG. 5A, FIG. 5B, and FIG. 5C are described. As illustrated in FIG. 5A, FIG. 5B, and FIG. 5C, the TP 31 is printed on the medium 30 as a result of Step S110. The TP 31 is a plain image with the ink of one color, and is printed by using the C ink in this case. The TP 31 is printed by the overlapping portion 22, and is not printed by the normal portion. However, the TP 31 may include a region printed by the normal portion in addition to a region printed by the overlapping portion 22. In FIG. 5A, FIG. 5B, and FIG. 5C, numerical values such as 0, +1, and −1 denoted in the parentheses next to the reference symbol 31 indicate adjustment values of the use ranges of the first nozzle and the second nozzle, which are employed by the control unit 11 for printing the TP 31. Further, in FIG. 5A, FIG. 5B, and FIG. 5C, among the nozzles 21 in the overlapping portion 22, a "used nozzle" that ejects the ink for printing the TP 31 is indicated with a simple circle, and a "non-used nozzle" that does not eject the ink for printing the TP 31 is indicated with a circle having an x mark therein.

As illustrated in FIG. 5A, the TP 31(0) corresponding to the adjustment value of 0 is the TP 31 printed by the nozzles denoted with the nozzle numbers #45 to #47 as used nozzles and the nozzles denoted with the nozzle numbers #48 to #50 as non-used nozzles in the nozzle row 20C4, and the nozzles denoted with the nozzle numbers #1 to #3 as non-used nozzles and the nozzles denoted with the nozzle numbers #4 to #6 as used nozzles in the nozzle row 20C5 among the respective nozzles 21 of the overlapping portion 22. In other words, at the time of printing the TP 31(0), the number of specified nozzle pairs is 0, in other words, m=0. Therefore, the TP 31(0) does not include a raster line printed in the OL printing. In this manner, in the ideal state as illustrated in FIG. 5A, when the adjustment value is 0, it can be said that printing by the overlapping portion 22 is substantially the same as printing by the normal portion.

As illustrated in FIG. 5B, the TP 31(+1) corresponding to the adjustment value of +1 is the TP 31 printed by the nozzles denoted with the nozzle numbers #45 to #48 as used nozzles and the nozzles denoted with the nozzle numbers #49 and #50 as non-used nozzles in the nozzle row 20C4, and the nozzles denoted with the nozzle numbers #1 to #3 as non-used nozzles and the nozzles denoted with the nozzle numbers #4 to #6 as used nozzles in the nozzle row 20C5 among the respective nozzles 21 of the overlapping portion 22. At the time of printing the TP 31(+1), the number of specified nozzle pairs is one, in other words, m=1. As illustrated in FIG. 5B, the nozzle 21 denoted with the nozzle number #48 in the nozzle row 20C4 and the nozzle 21 denoted with the nozzle number #4 in the nozzle row 20C5 correspond to the specified nozzle pair, and the TP 31(+1) includes a raster line printed by the specified nozzle pair in the OL printing.

Note that the OL printing in general is performed by allocating, to each of two nozzles forming a nozzle pair, approximately 50% of the data relating to a plurality of pixels forming one raster line to be printed by the nozzle pair. In contrast, in the TP printing performed in Step S110, the control unit 11 allocates, to each of the first nozzle and the second nozzle that form a specified nozzle pair, 100% of the data relating to a plurality of pixels forming one raster line to be printed by the specified nozzle pair. Therefore, in the example of FIG. 5B, the same raster line is printed by each of the nozzle 21 denoted with the nozzle number #48 in the nozzle row 20C4 and the nozzle 21 denoted with the nozzle number #4 in the nozzle row 20C5 in an overlapping manner.

As illustrated in FIG. 5C, the TP 31(−1) corresponding to the adjustment value of −1 is the TP 31 printed by the nozzles denoted with the nozzle numbers #45 and #46 as used nozzles and the nozzles denoted with the nozzle numbers #47 to #50 as non-used nozzles in the nozzle row 20C4, and the nozzles denoted with the nozzle numbers #1 to #3 as non-used nozzles and the nozzles denoted with the nozzle numbers #4 to #6 as used nozzles in the nozzle row 20C5 among the respective nozzles 21 of the overlapping portion 22. In other words, at the time of printing the TP 31(−1), similarly to the TP 31(0), m is 0. The TP 31(−1) does not include a raster line printed in the OL printing. Moreover, the negative adjustment value indicates presence of a "non-used nozzle pair" being a nozzle pair in which both the first nozzle and the second nozzle are non-used nozzles. When the adjustment value is −1, the number of non-used nozzle pair is one. As illustrated in FIG. 5C, the nozzle 21 denoted with the nozzle number #47 in the nozzle row 20C4 and the nozzle 21 denoted with the nozzle number #3 in the nozzle row 20C5 correspond to the non-used nozzle pair. When the non-used nozzle pair is present, a raster line at a position corresponding to the non-used nozzle pair is not printed among the respective raster lines in the printing data.

In this manner, in Step S110, the control unit 11 controls the printing head 19 to print, on the medium 30, the plurality of TPs 31 with the different adjustment values such as the TP 31(0), the TP 31(+1), and the TP 31(−1). Although not illustrated, the control unit 11 may further control the printing head 19 to print the TP 31(+2) with the adjustment value of +2 and the TP 31(−2) with the adjustment value of −2. When the adjustment value is +2, in other words, m=2, a nozzle pair of the nozzle 21 denoted with the nozzle number #49 in the nozzle row 20C4 and the nozzle 21 denoted with the nozzle number #5 in the nozzle row 20C5 also corresponds to the specified nozzle pair, in addition to the nozzle pair of the nozzle 21 denoted with the nozzle number #48 in the nozzle row 20C4 and the nozzle 21 denoted with the nozzle number #4 in the nozzle row 20C5. In contrast, when the adjustment value is −2, in other words, m=0, a nozzle pair of the nozzle 21 denoted with the nozzle number #46 in the nozzle row 20C4 and the nozzle 21 denoted with the nozzle number #2 in the nozzle row 20C5 also corresponds to the non-used nozzle pair, in addition to the nozzle pair of the nozzle 21 denoted with the nozzle number #47 in the nozzle row 20C4 and the nozzle 21 denoted with the nozzle number #3 in the nozzle row 20C5. When two or more specified nozzle pairs are formed in the overlapping portion 22, the control unit 11 performs control so that the plurality of specified nozzle pairs are formed sequentially in the nozzle array direction D3. Similarly, when two or more non-used nozzle pairs are formed in the overlapping portion 22, the control unit 11 performs control so that the plurality of non-used nozzle pairs are formed sequentially in the nozzle array direction D3.

In Step S120, the control unit 11 acquires a reading result of the TP 31 that is printed on the medium 30 in Step S110.

For example, a user visually reads the TP 31 printed on the medium 30. Specifically, a user evaluates density of a "specified region 32" from a "first printing position" to a "second printing position" of the TP 31. The first printing position is a printing position among the printing positions of the first nozzles that is closest to the printing region by the second nozzles. The second printing position is a printing position among the printing positions of the second nozzles that is closest to the printing region by the first nozzles. In FIG. 5A, FIG. 5B, and FIG. 5C, the specified region 32 of each of the TP 31(0), the TP 31(+1), and the TP 31(−1) is illustrated surrounded by the broken line. The mark such as the broken line for illustrating the specified region 32 in an understandable way may actually be printed together with the TP 31 in Step S110, or may not be printed.

As understood from the description given above, at the time of printing the TP 31(0), among the printing positions of the respective nozzles 21 in the nozzle row 20C4 on the medium 30, the printing position of the nozzle 21 denoted with the nozzle number #47 is closest to the nozzle row 20C5. Thus, the printing position of the nozzle 21 denoted with the nozzle number #47 corresponds to the first printing position. Further, among the printing positions of the respective nozzles 21 in the nozzle row 20C5 on the medium 30, the printing position of the nozzle 21 denoted with the nozzle number #4 is closest to the nozzle row 20C4. Thus, the printing position of the nozzle 21 denoted with the nozzle number #4 corresponds to the second printing position. Therefore, in the TP 31(0), the region from the printing position of the nozzle 21 denoted with the nozzle number #47 in the nozzle row 20C4 to the printing position of the nozzle 21 denoted with the nozzle number #4 in the nozzle row 20C5 in the width direction D2 corresponds to the specified region 32.

Similarly, at the time of printing the TP 31(+1), the printing position of the nozzle 21 denoted with the nozzle number #48 in the nozzle row 20C4 on the medium 30 corresponds to the first printing position, and the printing position of the nozzle 21 denoted with the nozzle number #4 in the nozzle row 2005 on the medium 30 corresponds to the second printing position. Therefore, in the TP 31(+1), the region from the printing position of the nozzle 21 denoted with the nozzle number #48 in the nozzle row 20C4 to the printing position of the printing position of the nozzle 21 denoted with the nozzle number #4 in the nozzle row 20C5 in the width direction D2 corresponds to the specified region 32. As understood from FIG. 5B, in the ideal state, the printing position of the nozzle 21 denoted with the nozzle number #48 in the nozzle row 20C4 matches with the printing position of the nozzle 21 denoted with the nozzle number #4 in the nozzle row 20C5. Thus, in the example of FIG. 5B, the specified region 32 is a region corresponding to one raster line.

Similarly, at the time of printing the TP 31(−1), the printing position of the nozzle 21 denoted with the nozzle number #46 in the nozzle row 20C4 on the medium 30 corresponds to the first printing position, and the printing position of the nozzle 21 denoted with the nozzle number #4 in the nozzle row 2005 on the medium 30 corresponds to the second printing position. Therefore, in the TP 31(−1), the region from the printing position of the nozzle 21 denoted with the nozzle number #46 in the nozzle row 20C4 to the printing position of the printing position of the nozzle 21 denoted with the nozzle number #4 in the nozzle row 20C5 in the width direction D2 corresponds to the specified region 32.

When the above-mentioned adjustment value is a positive value, the TP 31 includes the raster line printed by the specified nozzle pair in the OL printing. Thus, a "black streak" is easily generated in the specified region 32. The black streak indicates unevenness having density higher than a color in the vicinity in the TP 31, that is, having a darker color, and is not always black. In the example of FIG. 5B, a black streak is generated in the specified region 32. In contrast, when the adjustment value is a negative value, the TP 31 is printed by the overlapping portion 22 including the non-used nozzle pair. Thus, a "white streak" is easily generated in the specified region 32. The white streak indicates unevenness having density lower than a color in the vicinity in the TP 31, that is, having a lighter color, and is not always white. In the example of FIG. 5C, a white streak is generated in the specified region 32. Further, when the adjustment value is 0, the specified nozzle pair or the non-used nozzle pair is not present. Thus, a black streak or a white streak is not easily generated in the specified region 32. In the example of FIG. 5A, a black streak or a white streak is not generated in the specified region 32.

However, even when the adjustment value is a positive value, a black streak is not generated in the TP 31 in some cases. Even when the adjustment value is a negative value, a white streak is not generated in the TP 31 in some cases. For example, it is assumed that the TP 31(+1) is printed as described in FIG. 5B in a state in which the positional relationship between the nozzle row 20C4 and the nozzle row 20C5 is farther than that in the ideal state as illustrated in FIG. 3C. In this case, the nozzle 21 denoted with the nozzle number #48 in the nozzle row 20C4 is deviated to the left from the nozzle 21 denoted with the nozzle number #4 in the nozzle row 20C5, and hence an overlapping amount between the raster line printed by the nozzle 21 denoted with the nozzle number #48 in the nozzle row 20C4 and the raster line printed by the nozzle 21 denoted with the nozzle number #4 in the nozzle row 20C5 is reduced. As a result, there may be a possibility that a black streak is hardly generated in the specified region 32.

Further, it is assumed that the TP 31(−1) is printed as described in FIG. 5C in a state in which the positional relationship between the nozzle row 20C4 and the nozzle row 20C5 is closer than that in the ideal state as illustrated in FIG. 3B. In this case, the nozzle 21 denoted with the nozzle number #46 in the nozzle row 20C4 and the nozzle 21 denoted with the nozzle number #4 in the nozzle row 20C5 are closer to each other than those in the ideal state. Thus, even when the nozzle 21 denoted with the nozzle number #47 in the nozzle row 20C4 and the nozzle 21 denoted with the nozzle number #3 in the nozzle row 20C5 are present as the non-used nozzle pair, the raster line printed by the nozzle 21 denoted with the nozzle number #46 in the nozzle row 20C4 and the raster line printed by the nozzle 21 denoted with the nozzle number #4 in the nozzle row 20C5 are closer to each other. As a result, there may be a possibility that a white streak is hardly generated in the specified region 32. Further, when the positional relationship between the nozzle row 20C4 and the nozzle row 20C5 is not in the ideal state, there may be a possibility that a black streak or a white streak is generated in the specified region 32 at the time of printing the TP 31(0) as described in FIG. 5A.

A user visually evaluates the plurality of TPs 31 printed on the medium 30, selects the TP 31 with the most satisfactory image quality, operates the operation reception unit 14, and notifies the control unit 11 of the selection result. Satisfactory image quality indicates that a white streak or a black streak is not noticeable. Even when a user does not clearly recognizes the specified region 32 in the TP 31, the TP 31 in which a black streak or a white streak is intensively generated in the specified region 32 is not selected as a result, and the TP 31 in which a black streak or a white streak is not generated or is hardly noticeable in the specified region 32 is selected. Thus, it can be understood that a user reads the specified region 32.

Identification information such as a number, a name, and an adjustment value may be printed together with the respective TPs 31 having different adjustment values so that a user can easily select the TP 31. A user may input the identification information relating to the selected TP 31 via the operation reception unit 14 to notify the control unit 11. Such processing for acquiring the selection result of the TP 31 from a user corresponds to acquisition of the reading result of the TP 31 in Step S120.

Instead of visual reading by a user, the TP 31 printed on the medium 30 may be read by a reading device (not illustrated) such as a scanner and a colorimeter, and read image data or a colorimetric value as a reading result may be transmitted from the reading device to the printing apparatus 10 via the communication IF 16. In other words, in Step S120, the control unit 11 may acquire the reading result of the TP 31 from the reading device.

In Step S130, the control unit 11 determines the use range of the first nozzles and the use range of the second nozzles, in accordance with the reading result acquired in Step S120. When the selection result of the TP 31 is acquired from a user, the control unit 11 determines the use range employed at the time of printing the TP 31 selected by a user. For example, when a user selects the TP 31(+1), the control unit 11 determines the range corresponding to the nozzle numbers #45 to #48 in the nozzle row 20C4 in the overlapping portion 22 as the use range of the first nozzles in the overlapping portion 22, and determines the range corresponding to the nozzle numbers #4 to #6 in the nozzle row 20C5 in the overlapping portion 22 as the use range of the second nozzles in the overlapping portion 22, as illustrated in FIG. 5B. In this case, the number of specified nozzle pairs to be used for the OL printing in the overlapping portion 22 is one.

When read image data or a colorimetric value is acquired as the reading result of the TP 31 from the reading device, the control unit 11 may analyze the reading result for each of the TPs 31, may evaluate presence or absence and a degree of a black streak or a white streak in the specified region 32, based on predetermined evaluation criteria, and may select the TP 31 with the most satisfactory image quality. In other words, as described above, selection of the TP 31 by a user may be executed by the control unit 11 according to the program 12. Further, for the overlapping portion 22, the control unit 11 determines the use range of the first nozzles and the use range of the second nozzles as the use ranges employed at the time of printing the selected TP 31. In this manner, in Step S120 and Step S130, the control unit 11 determines the use range of the first nozzles and the use range of the second nozzles, based on density of the specified region 32 in the TP 31 printed on the medium 30.

In the examples of FIG. 5A, FIG. 5B, and FIG. 5C, at the time of printing the TP 31, the use range of the nozzles 21 in the nozzle row 20C5 being the second nozzle row is fixed regardless of the adjustment value, and the use range of the nozzles 21 in the nozzle row 20C4 being the first nozzle row is changed in the overlapping portion 22 in accordance with the adjustment value. As a matter of course, at the time of printing the TP 31, the control unit 11 may fix the use range of the nozzles 21 in the first nozzle row, and may change the use range of the nozzles 21 in the second nozzle row in accordance with the adjustment value. In this manner, in the overlapping portion 22, when only the use range of the nozzles 21 in one nozzle row of the first nozzle row and the second nozzle row is changed, the use range of the first nozzles and the use range of the second nozzles are determined by determining the use range of the nozzles 21 in the nozzle row with a changeable use range. As a matter of course, at the time of printing the TP 31, the control unit 11 may change the use range of the nozzles 21 in the first nozzle row and the use range of the nozzles 21 in the second nozzle row in accordance with the adjustment value.

When the use range of the first nozzles and the use range of the second nozzles are determined, the control unit 11 stores the determination content, and terminates the flowchart of FIG. 4. Determination of the use range also indicates determination of the non-use range of the nozzles 21 at the same time. All the nozzles 21 correspond to the use range in the normal portion, and hence there is no need to newly determine the use range and the non-use range. When printing is subsequently performed in accordance with an instruction from a user, the control unit 11 employs the ranges determined described above as the use range of the first nozzles and the use range of the second nozzles in the overlapping portion 22 to perform printing. With this, in the printing result by the overlapping portion 22, degradation of image quality due to density unevenness such as a black streak and a white streak can be suppressed. At the same time, the number of specified nozzle pairs for the OL printing can be reduced as much as possible in the overlapping portion 22. In the specific examples given above, the number of specified nozzle pairs can be suppressed to one or two. In some cases, the number of specified nozzle pairs is 0, or the number of non-used nozzle pairs is one or two. As a result, a problem, specifically, a noticeable density difference between the region printed by the normal portion and the region printed by the overlapping portion 22 in the OL printing can also be solved.

As illustrated in FIG. 2, the printing head 19C corresponding to ejection of the C ink includes the plurality of overlapping portions 22, and the positional relationship between the nozzle rows that share the overlapping portion 22 is slightly different for each of the overlapping portions 22. Similarly, each of the printing heads 19M, 19Y, and 19K other than the printing head 19C also includes the plurality of overlapping portions 22. Thus, in the flowchart of FIG. 4, the control unit 11 uses each of the plurality of overlapping portions 22 of the printing heads 19C, 19M, 19Y, and 19K to print the TP 31 on the medium 30 as described above, and determines the use range of the first nozzles and the use range of the second nozzles for each of the overlapping portions 22, based on the reading result of the TP 31 by each of the overlapping portions 22.

3. Second Embodiment

Next, the second embodiment is described. In the second embodiment, description commonly shared with the first embodiment is basically omitted.

Figure 6:
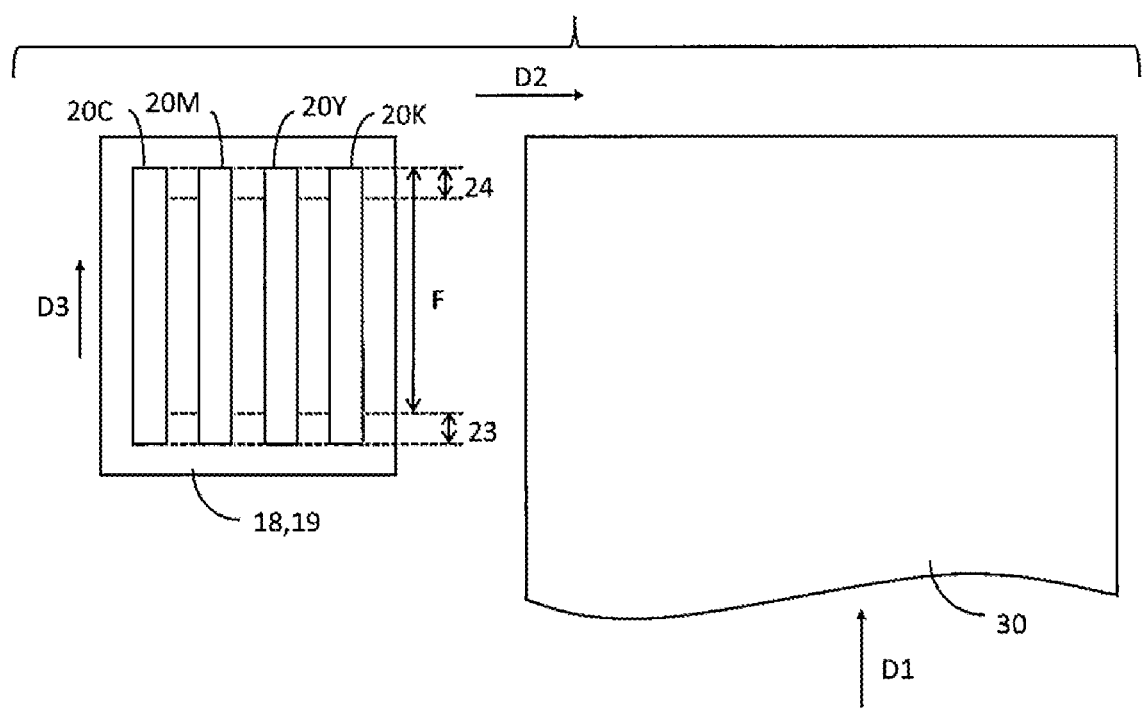
FIG. 6 is a diagram illustrating a relationship between a printing head according to a second embodiment and a medium, as seen from above, in a simplified manner.

FIG. 6 illustrates a relationship between the printing head 19 according to the second embodiment and the medium 30, as seen from above, in a simplified manner. The direction D2 intersecting with the transport direction D1 is the width direction of the medium 30, and is also the main scanning direction D2 of the carriage 18 and the printing head 19. In the second embodiment, the main scanning direction D2 corresponds to the "first direction". In FIG. 6, the carriage 18 and the printing head 19 mounted on the carriage 18 are integrally illustrated without distinction.

The printing head 19 includes the nozzle row 20C in which the plurality of nozzles 21 for ejecting the C ink are arrayed in the nozzle array direction D3, the nozzle row 20M in which the plurality of nozzles 21 for ejecting the M ink are arrayed in the nozzle array direction D3, the nozzle row 20Y in which the plurality of nozzles 21 for ejecting the Y ink are arrayed in the nozzle array direction D3, and the nozzle row 20K in which the plurality of nozzles 21 for ejecting the K ink are arrayed in the nozzle array direction D3. The plurality of nozzle rows 20C, 20M, 20Y, and 20K are arrayed in the main scanning direction D2.

The nozzle array direction D3 intersects with the main scanning direction D2. In the example of FIG. 6, the nozzle array direction D3 is parallel with the transport direction D1, but may be inclined obliquely with respect to the transport direction D1. As to the nozzle row 20C, the C ink corresponds to the "first liquid". Similarly, as to the nozzle row 20M, the M ink corresponds to the first liquid. The printing head 19 according to the second embodiment described above is a printing head used in a so-called serial printer. In the second embodiment, the raster line is a line-shaped image having a length component in the main scanning direction D2, and is a pixel row in which pixels are arrayed in the main scanning direction D2 in the printing data.

In the second embodiment, the transport unit 17 transports the medium 30 between one pass and a pass subsequent thereto such that a region of the medium 30 printable by using an upstream portion 23 including the "first nozzles" during the one pass is printable by using a downstream portion 24 including the "second nozzles" during the pass subsequent to the one pass, the "first nozzles" being the plurality of nozzles 21 upstream in the nozzle rows, the "second nozzles" being the plurality of nozzles 21 downstream in the nozzle rows. Such transport is also referred to as "paper feeding". FIG. 6 illustrates the range of the upstream portion 23 and the range of the downstream portion 24 in each of the nozzle rows 20C, 20M, 20Y, and 20K of the printing head 19.

The reference symbol F in FIG. 6 indicates a single paper feeding amount. Paper feeding is performed by the paper feeding amount F. With this, printing can be performed by the downstream portion 24 in the subsequent pass on the region of the medium 30 on which printing is performed by the upstream portion 23 in the pass. In other words, the upstream portion 23 and the downstream portion 24 that are physically way from each other in the same nozzle row sequentially form an overlapping portion with respect to the medium 30, and the overlapping portion can perform the OL printing in units of the raster lines. The overlapping portion 22 in the first embodiment may be regarded and understood as a sequential overlapping portion in the second embodiment. Further, in the second embodiment, a range that does not correspond to the upstream portion 23 or the downstream portion 24 in the nozzle row is the "normal portion".

In the second embodiment, a pair of the first nozzle and the second nozzle establishing such a relationship that a position in the upstream portion 23 and a position in the downstream portion 24 correspond to each other in the same nozzle row is referred to as a "nozzle pair". The upstream portion 23 and downstream portion 24 in one nozzle row include the n nozzle pairs. The first nozzle and the second nozzle establishing such a relationship that the position in the upstream portion 23 and the position in the downstream portion 24 correspond to each other indicate the first nozzle and the second nozzle in the same order in the upstream portion 23 and the downstream portion 24, respectively, in the transport direction D1. For example, in the nozzle row 20C, the downstream-most nozzle 21 in the upstream portion 23 and the downstream-most nozzle 21 in the downstream portion 24 form one nozzle pair. In a similar manner, in the nozzle row 20C, the second downstream-most nozzle 21 in the upstream portion 23 and the second downstream-most nozzle 21 in the downstream portion 24 form one nozzle pair. The control unit 11 controls the transport unit 17, the carriage 18, and the printing head 19 to alternately execute a pass involving ink ejection by the printing head 19 based on the printing data and paper feeding. With this, an image is printed on the medium 30. In other words, the control unit 11 executes a scanning step and a transport step. In the scanning step, the printing head 19 is caused to scan the medium 30 in the main scanning direction D2. In the transport step, the medium 30 is transported in the transport direction D1.

In the second embodiment, description is also made with reference to the flowchart in FIG. 4. Description on Step S100 is omitted. In Step S110, the control unit 11 starts controlling the transport unit 17 and the carriage 18, and controls the printing head 19 based on the TP printing data acquired in Step S100 to print, on the medium 30, the TP for determining the use range of the first nozzles in the upstream portion 23 and the use range of the second nozzles in the downstream portion 24. In this state, the control unit 11 causes the TP to be printed by m pairs of "specified nozzle pairs" of the first nozzles and the second nozzles that are used for ejection of the first liquid, among the nozzle pairs in the upstream portion 23 and the downstream portion 24. Here, $0 \leq m < n$.

Figure 7:
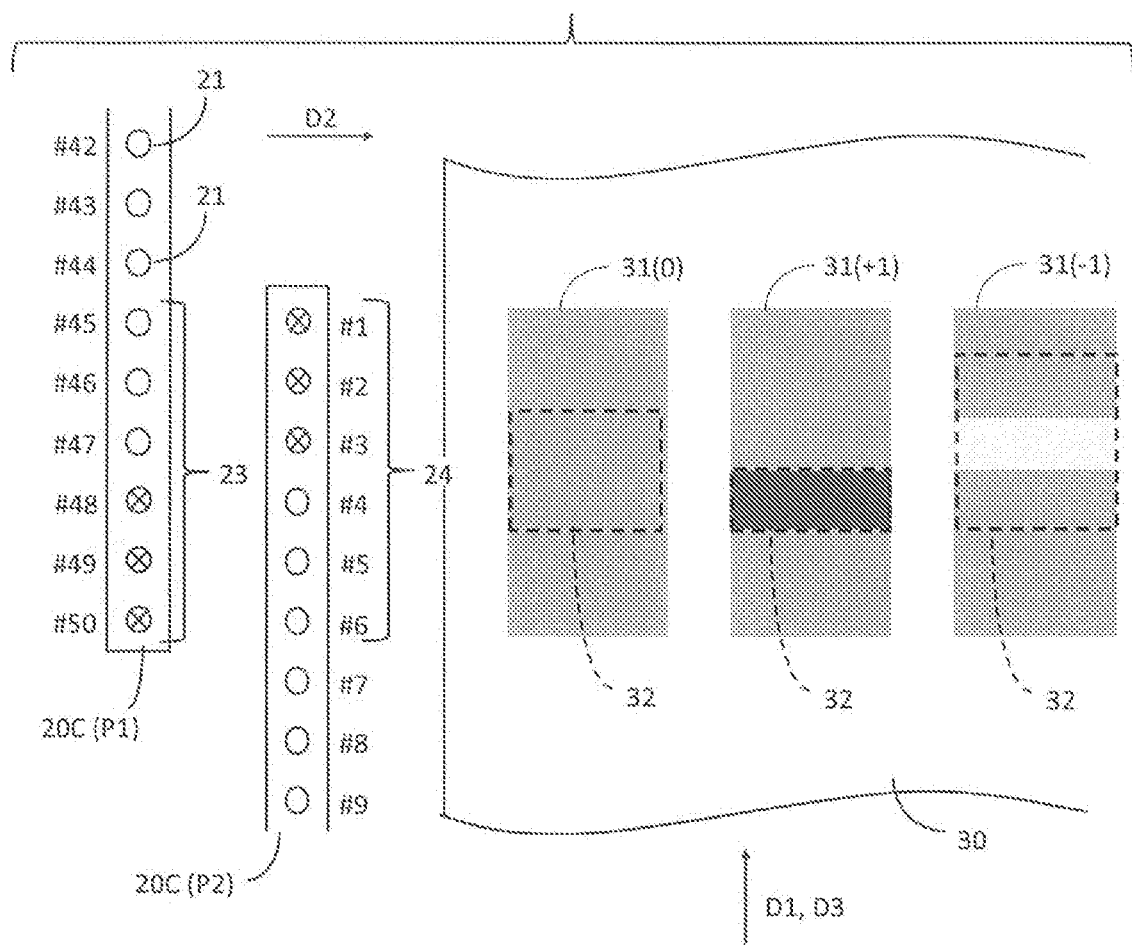
FIG. 7 is a diagram illustrating a sequential overlapping portion of an upstream portion and a downstream portion and a TP in the second embodiment.

FIG. 7 illustrates a printing result of the TP 31 in Step S110 together with a part of the nozzle row 20C. Printing of the TP 31 by the nozzle rows 20M, 20Y, and 20K other than the nozzle row 20C that are included in the printing head 19 may be understood with reference to the description for FIG. 7. In FIG. 7, the upstream portion 23 and the downstream portion 24 in the same nozzle row 20C are illustrated to be deviated from each other in the main scanning direction D2 for convenience of the description. The reference symbols "P1" and "P2" denoted in the parentheses next to the reference symbol 20C indicate different passes. In other words, after one operation of paper feeding, printing is performed by the downstream portion 24 in the nozzle row 20C in the pass P2 performed subsequent to the pass P1 on a region of the medium 30 on which printing is performed by the upstream portion 23 in the nozzle row 20C in the pass P1 at one time.

FIG. 7 illustrates an example in which paper feeding is performed ideally. Performing paper feeding ideally indicates a state in which the control unit 11 instructs the transport unit 17 to perform paper feeding by the paper feeding amount F, and as a result, accurate transport by the paper feeding amount F is performed. When paper feeding is performed ideally, the respective printing positions of the first nozzle and the second nozzle on the medium 30 that form a nozzle pair overlap with each other as viewed in the main scanning direction D2. However, the printing apparatus 10 has an individual difference, and the transport unit 17 does not always perform paper feeding ideally. In other words, even when the control unit 11 instructs the transport unit 17 to perform paper feeding by the paper feeding amount F, an actual paper feeding amount is slightly less or more than the paper feeding amount F in some cases. In the printing apparatus 10 in which paper feeding is not performed ideally as described above, the respective printing positions of the first nozzle and the second nozzle on the medium 30 that form a nozzle pair are deviated from each other as viewed in the main scanning direction D2.

In FIG. 7, the adjustment values of the use ranges of the first nozzle and the second nozzle, which are employed by the control unit 11 for printing the TP 31, are also denoted in the parentheses next to the reference symbol 31. First, printing of the TP 31(0) is described. The TP 31 is printed by the upstream portion 23 and the downstream portion 24, and is not printed by the normal portion. However, the TP 31 may be printed by the normal portion in addition to the upstream portion 23 and the downstream portion 24. In FIG. 7, similarly to FIG. 5A, among the nozzles 21 in the upstream portion 23 and the downstream portion 24, the used nozzle that ejects the ink for printing the TP 31(0) is indicated with a simple circle, and the non-used nozzle that does not eject the ink for printing the TP 31(0) is indicated with a circle having an x mark therein.

As illustrated in FIG. 7, the TP 31(0) corresponding to the adjustment value of 0 is the TP 31 printed by the nozzles denoted with the nozzle numbers #45 to #47 as used nozzles and the nozzles denoted with the nozzle numbers #48 to #50 as non-used nozzles, among the nozzles 21 denoted with the nozzle numbers #45 to #50 of the upstream portion 23, and the nozzles denoted with the nozzle numbers #1 to #3 as non-used nozzles and the nozzles denoted with the nozzle numbers #4 to #6 as used nozzles, among the nozzles 21 denoted with the nozzle numbers #1 to #6 of the downstream portion 24. At the time of printing the TP 31(0), the number of specified nozzle pairs is 0, in other words, m=0. The TP 31(0) does not include a raster line printed in the OL printing. In the ideal state as illustrated in FIG. 7, when the adjustment value is 0, it can be said that printing by the upstream portion 23 and the downstream portion 24 is substantially the same as printing by the normal portion.

In FIG. 7, the ranges of the used nozzles and the non-used nozzles corresponding to the TP 31(+1) printed with the adjustment value of +1 and the ranges of the used nozzles and the non-used nozzles corresponding to the TP 31(−1) printed with the adjustment value of −1 are omitted in description. Similarly to FIG. 5B, the control unit 11 prints the TP 31(+1) by the nozzles denoted with the nozzle numbers #45 to #48 as used nozzles and the nozzles denoted with the nozzle numbers #49 and #50 as non-used nozzles, among the nozzles 21 of the upstream portion 23, and the nozzles denoted with the nozzle numbers #1 to #3 as non-used nozzles and the nozzles denoted with the nozzle numbers #4 to #6 as used nozzles, among the nozzles 21 of the downstream portion 24. At the time of printing the TP 31(+1), the number of specified nozzle pairs is one, in other words, m=1. The TP 31(+1) includes the raster line printed by the one specified nozzle pair in the OL printing. As a matter of course, the one specified nozzle pair herein indicates the nozzle pair of the nozzle 21 denoted with the nozzle number #48 of the upstream portion 23 and the nozzle 21 denoted with the nozzle number #4 of the downstream portion 24.

Further, similarly to FIG. 5C, the control unit 11 prints the TP 31(−1) by the nozzles denoted with the nozzle numbers #45 and #46 as used nozzles and the nozzles denoted with the nozzle numbers #47 and #50 as non-used nozzles, among the nozzles 21 of the upstream portion 23, and the nozzles denoted with the nozzle numbers #1 to #3 as non-used nozzles and the nozzles denoted with the nozzle numbers #4 to #6 as used nozzles, among the nozzles 21 of the downstream portion 24. At the time of printing the TP 31(−1), similarly to the TP 31(0), m is 0. The TP 31(−1) does not include a raster line printed in the OL printing. The adjustment value is −1, and hence one non-used nozzle pair is present. As a matter of course, the one specified nozzle pair herein indicates the nozzle pair of the nozzle 21 denoted with the nozzle number #47 of the upstream portion 23 and the nozzle 21 denoted with the nozzle number #3 of the downstream portion 24.

In this manner, in Step S110, the control unit 11 controls the printing head 19 to print, on the medium 30, the plurality of TPs 31 with the different adjustment values such as the TP 31(0), the TP 31(+1), and the TP 31(−1). As a matter of course, in the second embodiment, the control unit 11 may also further control the printing head 19 to print the TP 31(+2) with the adjustment value of +2 and the TP 31(−2) with the adjustment value of −2.

Step S120 and Step S130 are also substantially the same as those described in the first embodiment. In other words, based on the reading result of the TP 31 printed on the medium 30, the control unit 11 evaluates density of the "specified region 32" from the "first printing position" to the "second printing position" of the TP 31. The first printing position is a printing position among the printing positions of the first nozzles that is closest to the printing region by the second nozzles. The second printing position is a printing position among the printing positions of the second nozzles that is closest to the printing region by the first nozzles. Then, the control unit 11 selects the TP 31 with the most satisfactory image quality in which a white streak or a black stream is not noticeable as much as possible. As a matter of course, the control unit 11 may receive such a selection result as an input by a user. Similarly to FIG. 5A, FIG. 5B, and FIG. 5C, the specified region 32 of each of the TP 31(0), the TP 31(+1), and the TP 31(−1) is illustrated surrounded by the broken line in FIG. 7. Further, the control unit 11 may determine the use range of the first nozzles in the upstream portion 23 and the use range of the second nozzles in the downstream portion 24 as the use range of the first nozzles in the upstream portion 23 and the use range of the second nozzles in the downstream portion 24 that are employed at the time of printing the selected TP 31.

As to the TP 31(0), among the printing positions of the respective nozzles 21 of the upstream portion 23 on the medium 30, the printing position of the nozzle 21 denoted with the nozzle number #47 is the upstream-most nozzle. Thus, the printing position of the nozzle 21 denoted with the nozzle number #47 corresponds to the first printing position. Further, among the printing positions of the respective nozzles 21 of the downstream portion 24 on the medium 30, the printing position of the nozzle 21 denoted with the nozzle number #4 is the downstream-most nozzle. Thus, the printing position of the nozzle 21 denoted with the nozzle number #4 corresponds to the second printing position. Thus, in the TP 31(0), the region from the printing position of the nozzle 21 denoted with the nozzle number #47 of the upstream portion 23 to the printing position of the nozzle 21 denoted with the nozzle number #4 of the downstream portion 24 in the transport direction D1 corresponds to the specified region 32. In the example of FIG. 7, a black stream or a white streak is not generated in the specified region 32 in the TP 31(0).

Similarly, as to the TP 31(+1), the printing position of the nozzle 21 denoted with the nozzle number #48 of the upstream portion 23 on the medium 30 corresponds to the first printing position, and the printing position of the nozzle 21 denoted with the nozzle number #4 of the downstream portion 24 on the medium 30 corresponds to the second printing position. Thus, in the TP 31(+1), the region from the printing position of the nozzle 21 denoted with the nozzle number #48 of the upstream portion 23 to the printing position of the printing position of the nozzle 21 denoted with the nozzle number #4 of the downstream portion 24 in the transport direction D1 corresponds to the specified region 32. As understood with reference to the description of FIG. 5B, in the ideal state, the specified region 32 in the TP 31(+1) in FIG. 7 is a region corresponding to one raster line. In the example of FIG. 7, a black stream is generated in the specified region 32 in the TP 31(+1).

Similarly, as to the TP 31(−1), the printing position of the nozzle 21 denoted with the nozzle number #46 of the upstream portion 23 on the medium 30 corresponds to the first printing position, and the printing position of the nozzle 21 denoted with the nozzle number #4 of the downstream portion 24 on the medium 30 corresponds to the second printing position. Thus, in the TP 31(−1), the region from the printing position of the nozzle 21 denoted with the nozzle number #46 of the upstream portion 23 to the printing position of the printing position of the nozzle 21 denoted with the nozzle number #4 of the downstream portion 24 in the transport direction D1 corresponds to the specified region 32. In the example of FIG. 7, a white streak is generated in the specified region 32 in the TP 31(−1).

As a matter of course, presence or absence and a degree of a black streak or a white streak in the respective TPs 31 having different adjustment values differ, based on whether paper feeding is performed ideally or an extent to which an actual paper feeding state is deviated from the ideal state.

When the control unit 11 determines the use range of the first nozzles in the upstream portion 23 and the use range of the second nozzles in the downstream portion 24, the control unit 11 stores the determination content, and terminates the flowchart of FIG. 4. When printing is subsequently performed in accordance with an instruction from a user, the control unit 11 employs the ranges determined described above as the use range of the first nozzles in the upstream portion 23 and the use range of the second nozzles in the downstream portion 24 to perform printing. With this, in the printing result by the sequential overlapping portion, degradation of image quality such as a black streak and a white streak can be suppressed. At the same time, the number of specified nozzle pairs for the OL printing can be reduced as much as possible in the sequential overlapping portion. As a result, a problem, specifically, a noticeable density difference between the region printed by the normal portion and the region printed by the sequential overlapping portion in the OL printing can also be solved.

In the second embodiment, on the medium 30, the region printed by the normal portion and the region printed by the sequential overlapping portion are generated alternately in the transport direction D1. In the first embodiment, the control unit 11 prints the TP 31 to determine the use ranges of the first nozzles and the second nozzles for each of the printing heads 19C, 19M, 19Y, and 19K and for each of the overlapping portions 22. Thus, similarly, in the second embodiment, the TP 31 may be printed to determine the use ranges of the first nozzles and the second nozzles for each of the nozzle rows 20C, 20M, 20Y, and 20K and for each of the sequential overlapping portions.

4. Other Correction Processing

In the first embodiment and the second embodiment, as described above, even when the use ranges of the first nozzles and the second nozzles are determined, and the determined use ranges of the first nozzles and the second nozzles are employed to perform printing, a difference between density of the specified region 32 formed in accordance with the determined use ranges of the first nozzles and the second nozzles and density of the region printed by the normal portion is not always suppressed completely. In view of this, in the first embodiment and the second embodiment, the control unit 11 may determine the use ranges of the first nozzles and the second nozzles, and then may further execute processing for correcting density of the specified region 32 formed in accordance with the determined use ranges of the first nozzles and the second nozzles. The control unit 11 performs such correction by employing the determined use ranges of the first nozzles and the second nozzles and causing the printing head 19 to print a second TP on the medium 30. Further, a user visually evaluates the specified region 32 in the second TP, and inputs a correction value corresponding to a density difference from the region printed by the normal portion in the second TP, by operating the operation reception unit 14.

In other words, when density of the specified region 32 in the second TP is higher than density of the region printed by the normal portion, a user inputs a correction value for reducing the ink ejection amount by operating the operation reception unit 14. In contrast, when density of the specified region 32 in the second TP is lower than density of the region printed by the normal portion, a user inputs a correction value for increasing the ink ejection amount by operating the operation reception unit 14. Further, the control unit 11 applies the correction value that is input as described above for correcting the raster line data to be allocated to the first nozzle corresponding to the first printing position and correcting the raster line data to be allocated to the second nozzle corresponding to the second printing position. Correction of the raster line data is correction for reducing or increasing dots defined in the printing data for the respective pixels or correction for reducing or increasing a tone value of the ink amount of each of the pixels in the image data before conversion into the printing data.

In a case of such correction processing, evaluation on the second TP that is performed visually by a user or determination of a correction value may also be automatically performed by the control unit 11, based on the reading result of the second TP by the reading device. Such correction processing is added to the first embodiment and the second embodiment, and hence a density difference between the region printed by the normal portion and the region printed by the overlapping portion 22 or the sequential overlapping portion can be eliminated at higher accuracy.

5. Conclusion

As described above, according to the first embodiment, the printing apparatus 10 includes the printing head 19 and the control unit 11. The printing head 19 includes the first nozzle row in which the plurality of first nozzles for ejecting the first liquid onto the medium 30 are arrayed in the predetermined nozzle array direction D3 and the second nozzle row in which the plurality of second nozzles for ejecting the first liquid onto the medium 30 are arrayed in the nozzle array direction D3. The control unit 11 controls ejection of the liquid including the first liquid from the printing head 19. The printing head 19 includes the overlapping portion 22 in which a part of the first nozzle row and a part of the second nozzle row overlap with each other, as seen in the first direction intersecting with the nozzle array direction D3. The overlapping portion 22 includes the n nozzle pairs arrayed in the nozzle array direction D3, where n is an integer equal to or greater than 2, and each of the n nozzle pairs is a pair of the first nozzle having a position within the overlapping portion 22 of the first nozzle row and the second nozzle having a position within the overlapping portion 22 of the second nozzle row corresponding to the position of the first nozzle. Further, when the control unit 11 controls the printing head 19 to print, on the medium 30, the TP31 for determining the use range of the first nozzles and the use range of the second nozzles in the overlapping portion 22, the control unit 11 causes the TP 31 to be printed by, of the nozzle pairs, the m specified nozzle pairs of the first nozzles and the second nozzles used for ejection of the first liquid, and the use range is determined, based on density of the specified region 32 from the first printing position to the second printing position, where m is an integer equal to or greater than 0 and less than n. The first printing position is, of the printing positions by the first nozzles in the test pattern TP 31 printed on the medium 30, the printing position closest to the printing region by the second nozzles. The second printing position is, of the printing positions by the second nozzles in the test pattern TP 31 printed on the medium 30, the printing position closest to the printing region by the first nozzles.

With the above-mentioned configuration, even when erroneous deviation is caused in the positional relationship between the first nozzle row and the second nozzle row that eject the first liquid, and density unevenness such as a black streak and a white streak may be generated in the printing result by the overlapping portion 22, the use range of the first nozzles and the use range of the second nozzles in the overlapping portion 22 are determined based on the result of the TP 31, instead of performing shift correction for the printing data to be allocated to the first nozzle row and the second nozzle row in units of the nozzle rows. With this, deviation between the first liquid and another liquid in the printing result, in other words, inter-color deviation can be prevented. At the same time, generation of density unevenness such as a black streak and a white streak can be suppressed. In addition, while the overlapping portion 22 includes the n nozzle pairs capable of performing the OL printing, the TP 31 is printed by the m specified nozzle pairs for performing the OL printing. With this, the number of specified nozzle pairs is reduced as much as possible. As a result, a problem, specifically, a noticeable density difference between the region printed by the portion other than the overlapping portion 22 in the nozzle row and the region printed by the overlapping portion 22 in the OL printing can also be solved.

Further, according to the second embodiment, the printing apparatus 10 includes the printing head 19, the carriage 18, the transport unit 17, and the control unit 11. The printing head 19 includes the nozzle rows in which the plurality of nozzles 21 for ejecting the first liquid onto the medium 30 are arrayed in the predetermined nozzle array direction D3. The carriage 18 causes the printing head 19 to scan the medium 30 along the main scanning direction D2 intersecting with the nozzle array direction D3. The transport unit 17 transports the medium 30 in the transport direction D1 intersecting with the main scanning direction D2. The control unit 11 controls ejection of a liquid including the first liquid from the printing head 19. The transport unit 17 transports the medium 30 between one scan and the scan subsequent thereto such that a region of the medium 30 printable by using the upstream portion 23 including first nozzles during the one scan is printable by using the downstream portion 24 including second nozzles during the scan subsequent to the one scan, the first nozzles being the plurality of nozzles 21 upstream in the transport direction D1 of the nozzle rows, the second nozzles being the plurality of nozzles 21 downstream in the transport direction D1 of the nozzle rows. The upstream portion 23 and the downstream portion 24 include the n nozzle pairs, where n is an integer equal to or greater than 2, and each of the n nozzle pairs is a pair of the first nozzle having a position within the upstream portion 23 and the second nozzle having a position within the downstream portion 24 corresponding to the position of the first nozzle. Further, when the control unit 11 controls the printing head 19 to print, on the medium 30, the TP31 for determining the use range of the first nozzles in the upstream portion 23 and the use range of the second nozzles in the downstream portion 24, the control unit 11 causes the TP 31 to be printed by, of the nozzle pairs, the m specified nozzle pairs of the first nozzles and the second nozzles used for ejection of the first liquid, and determines the use ranges, based on density of the specified region 32 from the first printing position to the second printing position, where m is an integer equal to or greater than 0 and less than n. The first printing position is, of the printing positions by the first nozzles in the test pattern TP 31 printed on the medium 30, the printing position closest to the printing region by the second nozzles. The second printing position is, of the printing positions by the second nozzles in the test pattern TP 31 printed on the medium 30, the printing position closest to the printing region by the first nozzles.

With the above-mentioned configuration, even when erroneous deviation is caused during transport between one scan and the scan subsequent thereto of the nozzle rows for ejecting the first liquid, and density unevenness such as a black streak and a white streak may be generated in the printing result by the sequential overlapping portion achieved by the upstream portion 23 and the downstream portion 24, the use range of the first nozzles in the upstream portion 23 and the use range of the second nozzles in the downstream portion 24 are determined based on the result of the TP 31, instead of performing shift correction for the printing data to be allocated to the nozzle rows for ejecting the first liquid in units of the scanning operations. With this, deviation between the first liquid and another liquid in the printing result, in other words, inter-color deviation can be prevented. At the same time, generation of density unevenness such as a black streak and a white streak can be suppressed. In addition, while the sequential overlapping portion includes the n nozzle pairs capable of performing the OL printing, the TP 31 is printed by the m specified nozzle pairs for performing the OL printing. With this, the number of specified nozzle pairs is reduced as much as possible. As a result, a problem, specifically, a noticeable density difference between the region printed by the portion other than the upstream portion 23 and the downstream portion 24 and the region printed by the upstream portion 23 and the downstream portion 24 in the OL printing can also be solved.

Further, according to the first embodiment and the second embodiment, the control unit 11 controls the printing head 19 to print the plurality of TPs 31 with m's during printing being different from each other.

With the above-mentioned configuration, the plurality of TPs 31 with the different values m are printed on the medium 30. Thus, a user or the control unit 11 can select the TP 31 having relatively satisfactory image quality as the printing result to determine the use ranges of the first nozzles and the second nozzles.

Further, the plurality of TPs 31 includes the TP 31 where m during printing is an integer equal to or greater than 1 and the TP 31 where m during printing is 0.

With the above-mentioned configuration, the plurality of TPs 31 including the TP 31(+1) corresponding to m=1, and the TP 31(0) and the TP 31(−1) corresponding to m=0 are printed on the medium 30 as illustrated in the drawings. Thus, from the TPs 31 with the number of specified nozzle pairs that is reduced as much as possible or is reduced to 0, the TP 31 having relatively satisfactory image quality as the printing result can be selected.

Further, in the first embodiment, the first direction may be the transport direction D1 in which the medium 30 is transported, and the first direction and the nozzle array direction D3 may be orthogonal to each other.

When the nozzle array direction D3 is orthogonal to the transport direction D1, a printing resolution in the width direction D2 orthogonal to the transport direction D1 is lower than that in the configuration in which the nozzle array direction D3 intersects obliquely with the transport direction D1. Thus, when the nozzle array direction D3 is orthogonal to the transport direction D1, it can be said that a white streak is more noticeable in the printing result due to erroneous deviation between the positions of the nozzle rows, as compared to the configuration in which the nozzle array direction D3 intersects obliquely with the transport direction D1. However, by applying the first embodiment, generation of a white streak due to the overlapping portion 22 can be suppressed.

Further, in the second embodiment, the transport direction D1 and the nozzle array direction D3 may be parallel to each other.

When the nozzle array direction D3 is parallel to the transport direction D1, a printing resolution in the transport direction D1 is lower than that in the configuration in which the nozzle array direction D3 intersects obliquely with the transport direction D1. Thus, when the nozzle array direction D3 is parallel to the transport direction D1, it can be said that a white streak is more noticeable in the printing result due to erroneous deviation in paper feeding, as compared to the configuration in which the nozzle array direction D3 intersects obliquely with the transport direction D1. However, by applying the second embodiment, generation of a white streak due to the sequential overlapping portion can be suppressed.

In addition to the printing apparatus and the system, the present embodiment also provides disclosures relating to various categories, such as the method to be executed by the printing apparatus and the system and the program 12 that causes the processor to execute the method.

In other words, according to the first embodiment, there can be understood the printing method for controlling ejection of the liquid including the first liquid from the printing head 19, the printing head 19 including the first nozzle row in which the plurality of first nozzles for ejecting the first liquid onto the medium 30 are arrayed in the predetermined nozzle array direction D3 and the second nozzle row in which the plurality of second nozzles for ejecting the first liquid onto the medium 30 are arrayed in the nozzle array direction D3, wherein the printing head 19 includes the overlapping portion 22 in which a part of the first nozzle row and a part of the second nozzle row overlap with each other, as seen in the first direction intersecting with the nozzle array direction D3, the overlapping portion 22 includes the n nozzle pairs arrayed in the nozzle array direction D3, where n is an integer equal to or greater than 2, and each of the n nozzle pairs is a pair of the first nozzle having a position within the overlapping portion 22 of the first nozzle row and the second nozzle having a position within the overlapping portion 22 of the second nozzle row corresponding to the position of the first nozzle, when the printing head 19 is controlled to print, on the medium 30, the TP 31 for determining the use range of the first nozzles and the use range of the second nozzles in the overlapping portion 22, the TP 31 is printed by, of the nozzle pairs, the m specified nozzle pairs of the first nozzles and the second nozzles used for ejection of the first liquid, where m is an integer equal to or greater than 0 and less than n, the use ranges are determined based on density of the specified region 32 from the first printing position to the second printing position, the first printing position is, of the printing positions by the first nozzles in the TP 31 printed on the medium 30, the printing position closest to the printing region by the second nozzles, and the second printing position is, of the printing positions by the second nozzles in the TP 31 printed on the medium 30, the printing position closest to the printing region by the first nozzles.

Further, according to the second embodiment, there can be understood the printing method for controlling ejection of the liquid including the first liquid from the printing head 19, the printing head 19 including the nozzle rows in which the plurality of nozzles 21 configured to eject the first liquid onto the medium 30 are arrayed in a predetermined nozzle array direction D3, the printing method including the scanning step of causing the printing head 19 to scan the medium 30 along the main scanning direction D2 intersecting with the nozzle array direction D3, and the transport step of transporting the medium 30 in the transport direction D1 intersecting with the main scanning direction D2, wherein in the transport step, the medium 30 is transported between one scan and the scan subsequent thereto such that a region of the medium 30 printable by using the upstream portion 23 including first nozzles during the one scan is printable by using the downstream portion 24 including second nozzles during the scan subsequent to the one scan, the first nozzles being the plurality of nozzles 21 upstream in the transport direction D1 of the nozzle rows, the second nozzles being the plurality of nozzles 21 downstream in the transport direction D1 of the nozzle rows, the upstream portion 23 and the downstream portion 24 include the n nozzle pairs, where n is an integer equal to or greater than 2, and each of the n nozzle pairs is a pair of the first nozzle having a position within the upstream portion 23 and the second nozzle having a position within the downstream portion 24 corresponding to the position of the first nozzle, when the printing head 19 is controlled to print, on the medium 30, the TP 31 for determining the use range of the first nozzles in the upstream portion 23 and the use range of the second nozzles in the downstream portion 24, the TP 31 is printed by, of the nozzle pairs, the m specified nozzle pairs of the first nozzles and the second nozzles used for ejection of the first liquid, where m is an integer equal to or greater than 0 and less than n, the use ranges are determined based on density of the specified region 32 from the first printing position to the second printing position, the first printing position is, of the printing positions by the first nozzles in the TP 31 printed on the medium 30, the printing position closest to the printing region by the second nozzles, and the second printing position is, of the printing positions by the second nozzles in the TP 31 printed on the medium 30, the printing position closest to the printing region by the first nozzles.

In the first embodiment, the number of TPs 31 printed by the printing head 19 under the control of the control unit 11 may be one for one type of a liquid and one overlapping portion 22, instead of the plurality of TPs 31. Similarly, in the second embodiment, the number of TPs 31 printed by the printing head 19 under the control of the control unit 11 may be one for one type of a liquid and one sequential overlapping portion, instead of the plurality of TPs 31.

In the first embodiment and the second embodiment, when density of the specified region 32 is lower than density of vicinity region of the specified region 32 in the TP 31, the control unit 11 may increase the use range of the first nozzles so that the printing region of the medium 30 by the first nozzles is expanded to the printing region by the second nozzles with respect to the first printing position. Further, when the density of the specified region 32 is higher than density of the vicinity region of the specified region 32 in the TP 31, the control unit 11 may reduce the use range of the first nozzles so that the printing region of the medium 30 by the first nozzles is reduced away from the printing region by the second nozzles with respect to the first printing position.

As an example, it is assumed that the control unit 11 controls the printing head 19 to print the TP 31(0) on the medium 30 (Step S110). In this case, the control unit 11 determines density of the specified region 32 in the TP 31(0) is higher or lower than that in the vicinity region, in accordance with an input from a user who visually reads the TP 31(0) or based on the reading result of the TP 31(0) by the reading device. The vicinity region described herein indicates a region other than the specified region 32 in the TP 31(0), and may also be referred to as an adjacent region or a periphery region of the specified region 32.

It is assumed that density of the specified region 32 in the TP 31(0) is lower than that in the vicinity region, in other words, a white streak is generated. In this case, description is made with reference to FIG. 5A and FIG. 7. The control unit 11 determines that the use range of the first nozzles is increased to the nozzle 21 denoted with the nozzle number #48 (Step S130). The nozzle 21 denoted with the nozzle number #48 is the first nozzle that is closer to the printing region by the second nozzle by one nozzle from the nozzle 21 denoted with the nozzle number #47 being the first nozzle corresponding to the first printing position at the time of printing the TP 31(0). With this determination, the number of specified nozzle pairs is increased from 0 to 1, and generation of a white streak is suppressed in the subsequent printing.

In contrast, it is assumed that density of the specified region 32 in the TP 31(0) is higher than that in the vicinity region, in other words, a black streak is generated. In this case, description is made with reference to FIG. 5A and FIG. 7. The control unit 11 determines that the use range of the first nozzles is reduced to the nozzle 21 denoted with the nozzle number #46 (Step S130). The nozzle 21 denoted with the nozzle number #46 is the first nozzle that is away to the printing region by the second nozzle by one nozzle from the nozzle 21 denoted with the nozzle number #47 being the first nozzle corresponding to the first printing position at the time of printing the TP 31(0). With this determination, the number of non-used nozzle pairs is increased from 0 to 1 while the number of specified nozzle pairs remains 0, and generation of a black streak is suppressed in the subsequent printing.

What is claimed is:

1. A printing apparatus, comprising:
   a printing head including:
   a first nozzle row in which a plurality of first nozzles configured to eject a first liquid onto a medium are arrayed in a predetermined nozzle array direction and
   a second nozzle row in which a plurality of second nozzles configured to eject the first liquid onto the medium are arrayed in the nozzle array direction; and
   a control unit configured to control ejection of a liquid including the first liquid from the printing head, wherein
   the printing head includes an overlapping portion in which a part of the first nozzle row and a part of the second nozzle row overlap with each other, as seen in a first direction intersecting with the nozzle array direction,
   the overlapping portion includes n nozzle pairs arrayed in the nozzle array direction, where n is an integer equal to or greater than 2, and each of the n nozzle pairs is a pair of the first nozzle having a position within the overlapping portion of the first nozzle row and the second nozzle having a position within the overlapping portion of the second nozzle row corresponding to the position of the first nozzle,
   when the control unit controls the printing head to print, on the medium, a test pattern for determining a use range of the first nozzles and a use range of the second nozzles in the overlapping portion, the control unit causes the test pattern to be printed by, of the nozzle pairs, m specified nozzle pairs of the first nozzles and the second nozzles used for ejection of the first liquid, where m is an integer equal to or greater than 0 and less than n,
   the control unit determines the use ranges, based on density of a specified region from a first printing position to a second printing position,
   the first printing position is, of printing positions by the first nozzles in the test pattern printed on the medium, a printing position closest to a printing region by the second nozzles, and
   the second printing position is, of printing positions by the second nozzles in the test pattern printed on the medium, a printing position closest to a printing region by the first nozzles.

2. The printing apparatus according to claim 1, wherein when the density of the specified region is lower than density of a vicinity region of the specified region in the test pattern, the control unit increases the use range of the first nozzles to expand the printing region by the first nozzles in the medium to the side of the printing region by the second nozzles with respect to the first printing position.

3. The printing apparatus according to claim 1, wherein when the density of the specified region is higher than density of a vicinity region of the specified region in the test pattern, the control unit decreases the use range of the first nozzles to reduce the printing region by the first nozzles in the medium away from the side of the printing region by the second nozzles with respect to the first printing position.

4. The printing apparatus according to claim 1, wherein the control unit controls the printing head to print a plurality of the test patterns with m's during printing being different from each other.

5. The printing apparatus according to claim 4, wherein the plurality of test patterns includes the test pattern where m during printing is an integer equal to or greater than 1 and the test pattern where m during printing is 0.

6. The printing apparatus according to claim 1, wherein the first direction is a transport direction in which the medium is transported and the first direction and the nozzle array direction are orthogonal to each other.

7. A printing method for controlling ejection of a liquid including a first liquid from a printing head, the printing head including a first nozzle row in which a plurality of first nozzles configured to eject the first liquid onto a medium are arrayed in a predetermined nozzle array direction and a second nozzle row in which a plurality of second nozzles configured to eject the first liquid onto the medium are arrayed in the nozzle array direction, wherein
- the printing head includes an overlapping portion in which a part of the first nozzle row and a part of the second nozzle row overlap with each other, as seen in a first direction intersecting with the nozzle array direction,
- the overlapping portion includes n nozzle pairs arrayed in the nozzle array direction, where n is an integer equal to or greater than 2, and each of the n nozzle pairs is a pair of the first nozzle having a position within the overlapping portion of the first nozzle row and the second nozzle having a position within the overlapping portion of the second nozzle row corresponding to the position of the first nozzle,
- when the printing head is controlled to print, on the medium, a test pattern for determining a use range of the first nozzles and a use range of the second nozzles in the overlapping portion, the test pattern is printed by, of the nozzle pairs, m specified nozzle pairs of the first nozzles and the second nozzles used for ejection of the first liquid, where m is an integer equal to or greater than 0 and less than n,
- the use ranges are determined based on density of a specified region from a first printing position to a second printing position,
- the first printing position is, of printing positions by the first nozzles in the test pattern printed on the medium, a printing position closest to a printing region by the second nozzles, and
- the second printing position is, of printing positions by the second nozzles in the test pattern printed on the medium, a printing position closest to a printing region by the first nozzles.

8. A printing apparatus comprising:
- a printing head including nozzle rows in which a plurality of nozzles configured to eject a first liquid onto a medium are arrayed in a predetermined nozzle array direction;
- a carriage configured to cause the printing head to scan the medium along a main scanning direction intersecting with the nozzle array direction;
- a transport unit configured to transport the medium in a transport direction intersecting with the main scanning direction; and
- a control unit configured to control ejection of a liquid including the first liquid from the printing head, wherein
- the transport unit transports the medium between one scan and a scan subsequent thereto such that a region of the medium printable by using an upstream portion including first nozzles during the one scan is printable by using a downstream portion including second nozzles during the scan subsequent to the one scan, the first nozzles being a plurality of nozzles upstream in the transport direction of the nozzle rows, the second nozzles being a plurality of nozzles downstream in the transport direction of the nozzle rows,
- the upstream portion and the downstream portion include n nozzle pairs, where n is an integer equal to or greater than 2, and each of the n nozzle pairs is a pair of the first nozzle having a position within the upstream portion and the second nozzle having a position within the downstream portion corresponding to the position of the first nozzle,
- when the control unit controls the printing head to print, on the medium, a test pattern for determining a use range of the first nozzles in the upstream portion and a use range of the second nozzles in the downstream portion, the control unit causes the test pattern to be printed by, of the nozzle pairs, m specified nozzle pairs of the first nozzles and the second nozzles used for ejection of the first liquid, where m is an integer equal to or greater than 0 and less than n,
- the control unit determines the use ranges, based on density of a specified region from a first printing position to a second printing position,
- the first printing position is, of printing positions by the first nozzles in the test pattern printed on the medium, a printing position closest to a printing region by the second nozzles, and
- the second printing position is, of printing positions by the second nozzles in the test pattern printed on the medium, a printing position closest to a printing region by the first nozzles.

9. A printing method for controlling ejection of a liquid including a first liquid from a printing head, the printing head including nozzle rows in which a plurality of nozzles configured to eject the first liquid onto a medium are arrayed in a predetermined nozzle array direction, the printing method comprising:
- a scanning step of causing the printing head to scan the medium along a main scanning direction intersecting with the nozzle array direction; and
- a transport step of transporting the medium in a transport direction intersecting with the main scanning direction, wherein
- in the transport step, the medium is transported between one scan and a scan subsequent thereto such that a region of the medium printable by using an upstream portion including first nozzles during the one scan is printable by using a downstream portion including second nozzles during the scan subsequent to the one scan, the first nozzles being a plurality of nozzles upstream in the transport direction of the nozzle rows, the second nozzles being a plurality of nozzles downstream in the transport direction of the nozzle rows,
- the upstream portion and the downstream portion include n nozzle pairs, where n is an integer equal to or greater than 2, and each of the n nozzle pairs is a pair of the first nozzle having a position within the upstream portion and the second nozzle having a position within the downstream portion corresponding to the position of the first nozzle,
- when the printing head is controlled to print, on the medium, a test pattern for determining a use range of the first nozzles in the upstream portion and a use range of the second nozzles in the downstream portion, the test pattern is printed by, of the nozzle pairs, m specified nozzle pairs of the first nozzles and the second nozzles used for ejection of the first liquid, where m is an integer equal to or greater than 0 and less than n,
- the use ranges are determined based on density of a specified region from a first printing position to a second
- the first printing position is, of printing positions by the first nozzles in the test pattern printed on the medium, a printing position closest to a printing region by the second nozzles, and the second printing position is, of printing positions by the second nozzles in the test pattern printed on the medium, a printing position closest to a printing region by the first nozzles.

\* \* \* \* \*